(12) United States Patent
Shen et al.

(10) Patent No.: US 7,985,388 B2
(45) Date of Patent: Jul. 26, 2011

(54) PROCESS FOR MAKING NANO-SIZED AND MICRO-SIZED PRECIPITATE PARTICLES

(75) Inventors: Zhigang Shen, Singapore (SG); Jiyao Zhang, Singapore (SG); Giawen Sim, Singapore (SG); Jimmy Sung Lai Yun, Singapore (SG); Jianfeng Chen, Singapore (SG)

(73) Assignee: NanoMaterials Technology Pte Ltd, Singapore (SG)

( * ) Notice: Subject to any disclaimer, the term of this patent is extended or adjusted under 35 U.S.C. 154(b) by 0 days.

(21) Appl. No.: 12/443,942

(22) PCT Filed: Oct. 2, 2007

(86) PCT No.: PCT/SG2007/000333
§ 371 (c)(1),
(2), (4) Date: Sep. 11, 2009

(87) PCT Pub. No.: WO2008/041951
PCT Pub. Date: Apr. 10, 2008

(65) Prior Publication Data
US 2010/0028236 A1 Feb. 4, 2010

Related U.S. Application Data

(60) Provisional application No. 60/849,167, filed on Oct. 2, 2006.

(51) Int. Cl.
*B01J 14/00* (2006.01)
*C01B 13/14* (2006.01)
*C01B 17/00* (2006.01)
*C01B 19/00* (2006.01)

(52) U.S. Cl. ............ 423/1; 423/508; 423/509; 423/511; 423/561.1; 423/592.1; 422/224; 422/225; 422/229; 977/773

(58) Field of Classification Search .............. 423/1, 508, 423/509, 511, 561.1, 592.1; 422/224, 225, 422/229; 977/773
See application file for complete search history.

(56) References Cited

U.S. PATENT DOCUMENTS

| | | | |
|---|---|---|---|
| 6,042,792 A * | 3/2000 | Shefer et al. | 422/259 |
| 6,653,356 B2 * | 11/2003 | Sherman | 516/90 |
| 2005/0218540 A1 * | 10/2005 | Sastry et al. | 264/10 |
| 2005/0260122 A1 * | 11/2005 | Li et al. | 423/594.14 |
| 2010/0025627 A1 * | 2/2010 | Naoi et al. | 252/182.1 |
| 2010/0055028 A1 * | 3/2010 | Scott et al. | 423/610 |
| 2010/0092377 A1 * | 4/2010 | Scott et al. | 423/610 |
| 2010/0119829 A1 * | 5/2010 | Karpov et al. | 428/407 |
| 2010/0158790 A1 * | 6/2010 | Jakli et al. | 423/566.1 |

FOREIGN PATENT DOCUMENTS

DE 102 23 567 A1 * 12/2003
JP 2005-255501 A * 9/2005

* cited by examiner

*Primary Examiner* — Timothy C Vanoy
(74) *Attorney, Agent, or Firm* — Kilpatrick Townsend & Stockton LLP

(57) ABSTRACT

There is disclosed a process of making nano-sized or micro-sized precipitate particles. The process comprising the steps of mixing, in a reaction zone, a metal salt solution with a precipitant solution to form a precipitate, said precipitate being at least one of a metal chalcogenide, metal hydroxide and metal oxide; and applying a shear force to said mixing solutions in said reaction zone during said mixing step, wherein said shear force and the conditions within said reaction zone form said nano-sized or micro-sized precipitate particles.

20 Claims, 25 Drawing Sheets (a)

(b)

(a)

(b)

(a)

(b)

PROCESS FOR MAKING NANO-SIZED AND MICRO-SIZED PRECIPITATE PARTICLES

CROSS-REFERENCE TO RELATED APPLICATIONS

This application is a national phase application under 35 USC §371 of PCT/SG2007/000333, filed Oct. 2, 2007, which claims priority to U.S. Provisional Application No. 60/849,167, filed Oct. 2, 2006.

TECHNICAL FIELD

The present invention generally relates to a method of preparing metal oxide, metal chalcogenide and metal hydroxide particles and metal oxide particles, and in particular nano-sized and micro-sized particles.

BACKGROUND

In recent times, nano-sized metal chalcogenides materials have been the subject of significant research due to their potential applications as biological markers, nonlinear optical materials, luminescent devices, photodetectors, catalysts, and chemical sensors, etc. One known method to prepare metal chalcogenide nanomaterials involves reaction in a confined medium such as a microemulsion or a polymer matrix whereby difficulty has been encountered in producing particles of uniform sizes.

Although a large variety of synthesis approaches have been reported for the preparation of crystalline metal chalcogenides, the large-scale synthesis or mass production of nano-sized metal chalcogenides is still a challenge. Metal chalcogenides can be prepared using a variety of wet-chemical methods including sol-gel, co-precipitation, and hydrothermal synthesis.

The extensively applied sol-gel or co-precipitation procedures are based on the hydrolysis and condensation of metal halides or metal alkoxides as precursors in aqueous solution. However, these methods suffer some major drawbacks. For example, the as-synthesized precipitates are amorphous and subsequent heat treatment is necessary to induce crystallization. This additional step results in alteration, mainly particle growth, or even in destruction of the particle morphology. Further disadvantages of aqueous systems are difficulties in controlling reaction parameters, such as the hydrolysis rate of the metal alkoxides, pH, method of mixing, rate of oxidation or sulfuration and the nature and concentration of anions. Also, a high temperature is needed (higher than 500° C.) to calcine intermediates produced during the synthesis to obtain crystalline metal chalcogenides. This has a negative effect on the particles because sintering leads to the formation of micro-sized aggregates requiring a further step of grinding the aggregates to disperse the aggregates into their primary particles. However, the grinding step can only break down the aggregates incompletely to their primary particles.

Typically, hydrothermal synthesis is conducted with a batch type apparatus. An aqueous solution is heated up to 373-673 K and then aged for several hours or days. As the solution is heated, the metal chalcogenides become more soluble in water. A hydrothermal reaction therefore occurs to produce nuclei seeds for crystallization. Hydrothermal synthesis of nano-sized fine particles is an especially difficult problem without the use of any surfactants. In addition, the requirement for the hydrothermal reactor construction material to withstand the elevated temperature and pressure of hydrothermal synthesis adds to the production cost.

One method for synthesizing nano-sized superfine particles involves using a rotating packed bed (RPB) reactor to increase micro-mixing and mass transfer. For example, it was possible to obtain hydroxide, carbonate and oxalate (Fe$(OH)_2$, Zr$(OH)_4$, Al$(OH)_3$, Zn$(OH)_2$, $CaCO_3$, $BaCO_3$, $SrCO_3$, BaSn$(C_2O_4)_2 \cdot \frac{1}{2}H_2O$, CaZrO$(C_2O_4) \cdot 4H_2O$, BaTiO$(C_2O_4) \cdot 2H_2O$) through reactive precipitation, followed by calcination to form nano-sized oxidated particles. However this method could not synthesize oxidated nano-sized particles directly.

Another method provides carrying out a gas-liquid reaction in a rotating packed bed reactor to produce nano-sized zinc sulfide particles. The reaction, however, uses hydrogen sulfide gas as one of the reactants, which is a potential source for environmental pollution.

There is therefore a need to provide a process that overcomes, or at least ameliorates, one or more of the disadvantages described above.

SUMMARY

According to a first aspect, there is provided a process of making nano-sized or micro-sized precipitate particles, the process comprising the steps of:

mixing, in a reaction zone, a metal salt solution with a precipitant solution to form a precipitate, said precipitate being at least one of a metal chalcogenide, metal hydroxide and metal oxide; and applying a shear force to said mixing solutions in said reaction zone during said mixing step, wherein said shear force and the conditions within said reaction zone form said nano-sized or micro-sized precipitate particles.

Advantageously, the shear force applied to said mixed solutions forms nano-sized or micro-sized precipitate particles having a relatively narrow particle size distribution.

Advantageously, the shear force applied to said mixed solutions forms a substantially homogenous mixture in said reaction zone.

According to a second aspect, there is provided a process of making nano-sized metal or micro-sized chalcogenide particles comprising the steps of:

mixing a metal salt solution with a precipitant solution under conditions to precipitate nano-sized or micro-sized metal chalcogenide particles.

According to a third aspect, there is provided a process of making metal oxide particles comprising the step of mixing a metal salt solution with an oxygen-containing base under conditions to form a precipitate comprising mainly metal oxide. Advantageously, the conditions are such that formation of intermediate metal oxide species is inhibited.

According to a fourth aspect, there is provided a process of making at least one of nano-sized metal chalcogenide and metal oxide particles, the method comprising the step of applying a shear force to a mixture of a metal salt solution and a precipitant solution, said applying being undertaken under conditions to form said at least one nano-sized metal chalcogenide and metal oxide particles.

According to a fifth aspect, there is provided a nano-sized metal chalcogenide or metal oxide particle made in a method comprising the steps of:

mixing a metal salt solution with a precipitant solution under conditions to form nano-sized precipitate particles; and ageing said nano-sized precipitate particles under conditions to form nano-sized metal oxide or metal chalcogenide particles that are substantially crystalline.

According to a sixth aspect, there is provided a process of making micro-sized particles from nano-sized precipitate particles, the process comprising the steps of:

mixing, in a reaction zone, a metal salt solution with a precipitant solution to form a precipitate, said precipitate being at least one of a metal chalcogenide, metal hydroxide and metal oxide;

applying a shear force to said mixing solutions in said reaction zone during said mixing step, wherein said shear force and the conditions within said reaction zone form nano-sized precipitate particles; and ageing said nano-sized precipitate particles under conditions to form micro-sized particles.

According to a seventh aspect, there is provided a process of making nano-sized metal chalcogenide particles comprising the steps of:

mixing a metal salt solution with a precipitant solution comprising at least one of sulphur, selenium and tellurium; and applying a shear force to said solutions in said reaction zone during said mixing step, wherein said shear force and the conditions within said reaction zone form said nano-sized metal chalcogenide particles.

According to an eighth aspect, there is provided a process of making micro-sized metal chalcogenide particles from nano-sized metal chalcogenide particles comprising the steps of:

mixing a metal salt solution with a precipitant solution comprising at least one of sulphur, selenium and tellurium;

applying a shear force to said solutions in said reaction zone during said mixing step, wherein said shear force and the conditions within said reaction zone form nano-sized metal chalcogenide particles; and ageing said nano-sized metal chalcogenide particles under conditions to form micro-sized metal chalcogenide particles.

According to a ninth aspect, there is provided a process of nano-sized metal oxide particles comprising the steps of:

mixing a metal salt solution with an oxygen-containing base; and applying a shear force to said solutions in said reaction zone during said mixing step, wherein said shear force and the conditions within said reaction zone form said nano-sized precipitate particles.

In one embodiment of the ninth aspect, the process further comprises ageing said nano-sized precipitate particles under conditions to form crystalline nano-sized metal oxide particles.

According to a tenth aspect, there is provided a process of micro-sized metal oxide particles comprising the steps of:

mixing a metal salt solution with an oxygen-containing base;

applying a shear force to said solutions in said reaction zone during said mixing step, wherein said shear force and the conditions within said reaction zone form said nano-sized metal oxide particles; and ageing said nano-sized metal oxide particles under conditions to form micro-sized particles.

DEFINITIONS

The following words and terms used herein shall have the meaning indicated:

The term "chalcogen" refers to atoms of Group VIB of the Period Tables of Elements. More particularly, the term chalcogen includes elements selected from the group consisting of sulfur (S), selenium (Se), and tellurium (Te).

The term "chalcogenide" refers to a binary or multinary compound containing at least one chalcogen and at least one electropositive element or radical.

The term "metal chalcogenide" refers to a chalcogenide in which the at least one electropositive element is a metal cation.

The term "nano-sized" as used herein relates to an average particle size of less than about 1000 nm, particularly less than about 200 nm, more particularly between about 1 nm to about 100 nm.

The term "micro-sized" as used herein, unless specified, relates to an average particle size of between about 1 µm to about 100 µm.

The term "metal salt" refers to a compound comprised of at least one anion and at least one cation. The anions and cations of the metal salt may be either simple (monatomic) ions such as $Na^+$, and $Ag^+$, $Cu^+$, $Zn^{2+}$, $Ca^{2+}$, $Fe^{2+}$ $Cu^{2+}$ $Fe^{3+}$, $Ce^{3+}$, $Al^{3+}$, $Ce^{4+}$, $Cl^-$, or complex (polyatomic) ions such as $CH_3COO^-$, $NO_3^{2-}$, $SO_4^{2-}$. At least one of the cations in the metal salt is a metal.

The term "metal" as used herein means all metals, including, for example, semimetals, alkali metals, alkaline earth metals and transition metals and metals selected from the main groups of the Periodic Table of the Elements.

The term "metal salt solution" refers to a metal salt dissolved in a solvent, such as an aqueous solvent, or an organic solvent (i.e. ethanol), or mixture of aqueous and organic solvents, or a mixture of organic solvents.

The term "precipitant solution" as used herein includes any solute dissolved in a solvent that, when added to a metal salt solution, causes a precipitate to form or crystals to grow. The precipitant may include alkaline solutions such as an alkaline base, more particularly an oxygen-containing base or a chalcogen solution such as an alkali metal chalcogen (ie sodium sulfide ($Na_2S$) or an alkaline earth metal chalcogen (CaS, BeTe).

The term "reactant mixture" refers to a solution containing a mixture of the metal salt solution and the precipitant solution, which may be capable of reacting to form the precipitate particles or which may have already reacted to form the precipitate particles.

The term "oxygen-containing base" includes any molecule or ion that contains an oxygen atom which can form a bond with a metal ion by donating a pair of electrons. Exemplary oxygen-containing bases include alkali metal hydroxides (ie NaOH, LiOH, KOH), alkaline earth metal hydroxides (ie $Ca(OH)_2$), an ammonia solution (ie $NH_4OH$), alkali metal carbonates (ie $Na_2CO_3$, $K_2CO_3$), alkali hydrogen carbonates (ie $NaHCO_3$, $KHCO_3$), organic base (ie $(CH_3)_4NOH$) or a mixture thereof.

The term "narrow particle size distribution" as used herein refers to a steepness ratio, as measured on a SediGraph, of the precipitate particles being less than about 2. The size distribution of the precipitate particles in a given composition may be represented on a SediGraph which plots cumulative mass percent as a function of particle size. Where cumulative mass percent is the percent, by weight, of a distribution having a particle size of less than or equal to a given value and where particle size is the diameter of an equivalent spherical particle. The mean particle size in a distribution is the size in microns or nanometers of the precipitate particles at the 50% point on the SediGraph for that distribution. The width of the particle size distribution of a given composition can be characterized using a steepness ratio. As used herein, the "steepness ratio" is defined as the average diameter of the particles in the seventy-fifth mass percentile divided by the average diameter of the particles in the twenty-fifth mass percentile.

The term "surfactant" as used herein relates to any composition that is capable of altering surface tension between a liquid and the precipitate particles suspended in the liquid. Suitable Surfactants are taught in *McCutcheon's Emulsifiers & Detergents*, at pages 287-310 of the North American Edition (1994), and in *McCutcheon's Emulsifiers & Detergents*, at pages 257-278 and 280 of the International Edition (1994), both published by MC Publishing Co. (McCutcheon Division) of Glen Rock, N.J.

The term "stabilizer" used in the process according to the invention relates to any composition that is capable of stabilizing the particles of metal chalcogenide, metal oxide or metal hydroxide compounds in a liquid by preventing, or at least inhibiting, the particles from re-aggregating after a period of time. The properties of the particles will not be changed by the stabilizer.

The term "dispersant" or "dispersing agent" as used herein refers to a surface-active agent, which promotes the uniform suspension or separation of the precipitate particulars, particularly the nano-sized metal oxide or metal chalcogenide particles. The dispersant may be a polymeric dispersant. The polymeric dispersant may include anionic, cationic, non-ionic polymeric dispersants or combinations thereof. Suitable dispersants are taught in *McCutcheon's Functional Materials*, at pages 122-142 of the North American Edition (1994), as well as in *McCutcheon's Functional Materials*, at pages 47-56 of the International Edition (1994), both published by MC Publishing Company (McCutcheon Division) of Glen Rock, N.J.

The terms "isolating" or "isolation" used in the context of this disclosure refers to any process which involves the removal of the precipitate particles from reactant media, such as for example filtration, centrifugation, spray drying, freeze drying or any other known method of removing solids from liquids. It should be noted that the term does not necessarily mean that the precipitate particles are completely removed from reactant media as some reactant media may remain on the precipitate particles after an isolation step. However, the term does encompass complete removal of reactant media from the particles.

The terms "ageing" or "aging" refers to maintaining a suspension of precipitate particles under conditions (ie such as temperature, pressure, pH value and agitation rate) for a period of time to allow the precipitate particles to form a substantially crystalline structure. The crystalline structure of the precipitate particles may be formed after fast nucleation or by at least partial dissolving of the precipitate particles and re-crystallization of the dissolved precipitate particles on the undissolved precipitates particles to form particles with complete crystalline or larger sized precipitate particles.

The term "chemical ageing" or "chemical aging" refers to the process of ageing wherein chemicals such as acids or base are added to the reactant mixture during the ageing process to accelerate the ageing or aging process.

The term "intermediate metal hydroxide oxide species" include any metal hydroxide oxide compounds that are formed during the precipitation of a metal salt and a precipitant solution. For example, where the precipitant solution is a base, such as a sodium hydroxide (NaOH), hydroxide ions ($OH^-$) react in solution with iron (II) cations ($Fe^{2+}$) of a metal salt (ie such as iron sulphate ($FeSO_4$)) to form precipitate immediately. The precipitate does not exist as a single ferrous hydroxide phase or a single ferrous oxide phase, and are instead, a complex formed from a combination of the hydroxide and oxide. The above intermediate can further react on application of heat in a sintering or aging step to form complete iron oxide crystal or further react on application of bubbling air or oxygen to form $Fe_2O_3$ or $Fe_3O_4$ particles. However, it is more desirable to form the metal oxide without forming the iron intermediate wherein iron cations ($Fe^{2+}$) react directly with the hydroxide ions ($OH^-$) to form iron oxide and water. The word "substantially" does not exclude "completely" e.g. a composition which is "substantially free" from Y may be completely free from Y. Where necessary, the word "substantially" may be omitted from the definition of the invention.

The term "vortex" is to be interpreted broadly to include a spiral motion of a reactant mixture within a reaction zone, wherein spiral motion of the mass of the reactant mixture tends to draw the reactant mixture towards its center. It will be appreciated that the creation of the vortex may be dependent on the speed of agitation within the chamber defining the reaction zone, the viscosity of the reactant mixture used and possibly the shape and dimensions of the chamber defining the reaction zone. A mathematical model for the theoretical formation of a vortex of a non-compressible fluid is known in the art. For example, *Transport Phenomena*, Bird et al, Chapter 3, John Wiley & Sons, 1960 provides a general discussion of vortex fluid flows and in particular pages 108-111 disclose a mathematical model for prediction of a vortex depth in an agitated tank. Vortices in agitated tanks have also been experimentally investigated in other literature such as *Memoirs of the Faculty of Engineering*, Kyoto University, Vol. XVII, No. III, July 1955 by S Nagata et al.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DETAILED DISCLOSURE OF EMBODIMENTS

The Process

Exemplary, non-limiting embodiments of a process of making nano-sized metal chalcogenide and metal oxide particles are disclosed. The method comprises the step of mixing a metal salt solution with a precipitant solution under conditions to precipitate at least one of the nano-sized metal chalcogenide and metal oxide particles.

The metal salt compounds used in the process may be completely or partially soluble in a chosen solvent. Preferably, the metal salt is a metal acetate salt, metal halide salt, metal nitrate salt, metal phosphate salt, metal sulphate salt, hydrates thereof or a mixture thereof.

The metal of the metal salt solution may comprise a metal selected from the group consisting of alkali metals, alkaline earth metals and metals selected from the transition metals and metals selected from the main group of the Periodic Table of the Elements. Exemplary metals of the metal salt include Mg, Ca, Sr, Ba, Ag, Zn, Fe, Cu, Co, Al, Ce, Sn, Zr Nb, Ti and Cr.

The anions of the metal salt solution may comprise anions selected from the group consisting of halides, sulphates, nitrates, phosphates and acetate. Exemplary anions include but are not limited to $Cl^-$, $Br^-$, $SO_4^{2-}$, $CH_3COO^-$, $PO_4^{3-}$, and $NO_3^-$.

In one embodiment, the precipitant solution comprises an oxygen-containing base. The oxygen-containing base may be selected from the group consisting of alkali metal hydroxides, alkali metal carbonates, alkaline earth metal hydroxides, alkaline earth metal carbonates, alkaline earth metal hydrogen carbonates, organic base and mixtures thereof. Exemplary oxygen-containing bases are solutions of LiOH, NaOH, KOH, $NH_3.H_2O$, $Be(OH)_2$, $Mg(OH)_2$, $Ca(OH)_2$, $Li_2CO_3$, $Na_2CO_3$, $NaHCO_3$, $K_2CO_3$, $KHCO_3$, $(CH_3)_4NOH$ or the mixture of thereof.

The base solution can be formed by dissolving a base (ie such as NaOH or KOH) solid in a solvent. The solvent may include water, an organic liquid (ie such as alcohol) and mixtures thereof.

In one embodiment, the precipitant solution comprises a chalcogenide salt solution selected from the group consisting of an alkali metal chalcogenide salt, and an alkaline earth metal chalcogenide salt. Anions of the chalcogenide salt include sulfides, $HS^-$, $SeO_3^{2-}$, $TeO_3^{2-}$, hydrates thereof or mixtures thereof. Exemplary chalcogenide salt solutions include $Li_2S$, $Na_2S$, $K_2S$, $Li_2Se$, $Na_2Se$, CaS, CaSe, CaTe, $Na_2SeO_3$, $K_2SeO_3$, $Na_2TeO_3$, $K_2TeO_3$, hydrates thereof or mixtures thereof.

Advantageously, the shear force applied to said mixed solutions forms said nano-sized or micro-sized precipitate particles having a narrow particle size distribution characterized in that the steepness ratio of the final precipitate suspension is less than about 3, or less than about 2, or less than about 1.9, or less than about 1.8, or less than about 1.7, or less than about 1.6, or less than about 1.5, or less than about 1.3.

The method may comprise the step of agitating the solution substantially throughout said reaction zone to induce the shear force. The shear force within said reaction zone may have a Reynolds number in the range selected from the group consisting of 2000-200000, 5000-150000, 8000-100000, thereby enabling a high degree of mixing in said reaction zone.

The formed nano-sized precipitate particles have an average particle size of about 1 nm to about 100 nm; about 1 nm to about 20 nm; about 5 nm to about 30 nm; about 5 nm to about 50 nm; about 10 nm to about 20 nm; about 10 nm to about 50 nm; about 20 nm to about 50 nm; about 15 nm to about 30 nm; about 10 nm to about 100 nm; about 10 nm to about 60 nm; and about 15 m to about 20 nm.

The micro-sized precipitate particles may have an average particle size of about 100 nm to about 100 µm; 500 nm to about 100 µm; 750 nm to about 100 µm; about 1 µm to about 50 µm; about 1 µm to about 25 µm; about 1 µm to about 10 µm; and about 1 µm to about 5 µm.

The process may comprise the step of providing a surfactant in said mixture. The providing step may comprise the step of selecting the surfactant from the group consisting of: anionic surfactants, cationic surfactants, non-ionic surfactants, polymeric surfactants and mixtures thereof. Exemplary surfactants are selected from the group consisting of: sodium dodecyl-sulfate, sodium lauryl sulfate, sodium laurate, dioctylsodium sulphosuccinate, TWEEN® (polyethylene sorbitan monooleate), SPAN 80® (sorbitan monooleate), SPAN 85® (sorbitan trioleate), PLURONIC® (Ethylene Oxide/Propylene Oxide block copolymer), polyoxyethylene fatty acid esters, poly(vinylpyrrolidone), polyoxyethylene alcohol, polyethylene glycol, monodiglyceride, benzalkonium chloride, bis-2-hydroxyethyl oleyl amine, hydroxypropyl cellulose, hydroxypropyl methylcellulose and mixtures thereof.

The providing step may comprise the step of selecting the concentration of the surfactant in the reaction zone from the group consisting of: about 0.05% to about 10%; about 0.05% to about 5%; about 0.05% to about 1%; about 0.05% to about 0.5%; about 0.05% to about 0.1%; about 0.1% to about 10%; about 0.5% to about 10%; about 1% to about 10%; about 5% to about 10%; and about 0.1% to 2% by weight of the mixture.

The process may comprise the step of adding a particle dispersant to said mixture to inhibit agglomeration of the precipitate particles. The particle dispersant may be added during the mixing step. The particle dispersant may be an organic solvent optionally mixed with water. Exemplary dispersants suitable for use include imidazoline, oleyl alcohol and ammonium citrate.

These and other dispersants suitable for particles of the micro to nano-size are disclosed in *Organic Additives And Ceramic Processing*, by D. J. Shanefield, Kluwer Academic Publishing, Boston, 1996, which is incorporated herein in its entirety. Accordingly, the precipitate particles, particularly the nano-sized precipitate particles, are in one embodiment in dispersed form. Hence, the nano-sized particles are stable and do not generally form aggregates of larger-sized particles over a period of time. At the same time, the properties of the particles also do not change with time. The dispersant may be added to the mixture in an amount of about 0.05% to about 10% by weight of the mixture.

The process may comprise the step of:

injecting gas into said reaction zone during said applying step.

The process may comprise, during said ageing step, the step of:

injecting gas into the solution of suspended precipitate particles.

The gas can be oxygen, air or an inert gas such as nitrogen. Advantageously, different particles morphologies can be achieved by injecting different gases into the reaction zone or by injecting gases during different steps.

Micro-sized and nano-sized precipitate particles made in the disclosed process may be represented from by the following formula:

wherein

M is a metal, preferably a transition metal, selected from the group consisting of group IB, group IIB, group IVA and group VIIB of the Periodic Table of Elements;

X is oxygen or a chalcogen;

a is an integer of 1, 2 or 3; and b is an integer of 1, 2, 3, 4 or 5 and wherein combinations of a and b are such that the overall charge of the compound $M_aX_b$ is zero.

In one embodiment, the micro-sized and nano-sized metal chalcogenide precipitate particles made in the disclosed process may be selected from the group consisting of ZnS, ZnSe, ZnTe, PbS, PbSe, PbTe, CuS, CuSe, CuTe, CdS, CdSe, CdTe, MnS, MnSe, MnTe, $Ag_2S$, $Ag_2Se$, $Ag_2Te$.

Micro-sized and nano-sized metal chalcogenide and metal oxide precipitate particles made in the disclosed process may be selected from the group consisting of $ZnO$, $TiO_2$, $CeO_2$, $SnO_2$, $Fe_3O_4$, $Fe_2O_3$, $ZrO_2$, $CuO$, $MnO_2$, $Cu_2O$, $Al_2O_3$, $V_2O_3$, $Nb_2O_5$, $NiO$, $InO_3$, $HfO_2$, $Cr_2O_3$, $Ta_2O_5$, $Ga_2O_3$, $Y_2O_3$, $MoO_3$, $Co_3O_4$, $ZnS$, $PbS$, $CuS$, $CdS$, $MnS$, $MOS_2$, $Ag_2S$, $Sb_2S_3$, $ZnSe$, $CdSe$, $Sb_2Se_3$, $Bi_2Se_3$, $ZnTe$, $Ag_2Se$, and $Ag_2Te$.

In one embodiment, the process comprises the steps of:

(a) providing a metal salt in a solvent to form a metal salt solution;

(b) providing precipitant solution selected from the group consisting of a base, a chalcogenide salt and mixtures thereof;

(c) mixing the metal salt solution and precipitant solution to form a reactant mixture, said mixing being undertaken under conditions to form a suspension of nano-sized metal precipitate particles;

(d) ageing the nano-sized metal precipitate particles to form nano-sized metal oxide or metal chalcogenide particles; and (e) isolating the metal oxide or metal chalcogenide particles from the suspension.

The ageing step (d) can be chemical ageing involving the addition of chemicals such as an acid or a base to accelerate the aging process.

The ageing step (d) can be undertaken under conditions to form micro-sized particles from said formed nano-sized particles. The conditions can, for example, be:

1. Heating the suspension of precipitate particles that such the temperature rises gradually, while constantly agitating the suspension, for example, heating at a constant rate from 25° C. to about 95° C. under constant stirring;

2. Maintaining the pH of the suspension at a suitable pH range, for example, between about pH 5 to about pH 6 or between about pH 6 to about pH 8 for about 2 hr to about 10 hr at temperature of about 95° C.; and 3. Cooling the suspension to room temperature (ie 25° C.)

The heating step (1) can change the saturation capacity of the solvent, which may result in intensification of re-crystallization, or Ostwald ripening so as to let the precipitate particles grow or re-crystallize to form the particles with a crystal structure or larger sized particles.

The Molecular Mixing Unit

In one embodiment, the reaction zone is located within an enclosed chamber of a molecular mixing unit. The molecular mixing unit may comprise an agitator within said enclosed chamber. The molecular mixing unit may further comprise at least two fluid inlets to introduce fluids into said enclosed chamber and optionally one outlet to allow suspended precipitate to be removed from the enclosed chamber.

The use of an agitator to impart high shear to the reactant mixture ensures that the solutions are adequately and homogeneously mixed in very short time (i.e. less than 10 s, preferably less than 1 s, more preferably less than 10 ms) to form an intimate mixture leading to the reaction and the formation of a precipitate of the desired size.

In order to meet the requirement of micro-mixing for reactants in very short time, the molecular mixing unit may be operated under a turbulent state in order to impart high shear to the reactant mixture and to mechanically mix the two solutions. The solutions in the molecular mixing unit are quickly mixed by the turbulent fluid flow. Therefore, the Reynolds Number shall be regulated on the basis of the equation of:

$$Re = \frac{d \cdot u \cdot \rho}{\mu}$$

wherein, d is the diameter of the pipe (or distributor in the molecular mixing unit) providing the reactant solutions to the molecular mixing unit, u is the flow speed of the liquid stream, $\rho$ is the density of the liquid stream and $\mu$ is the viscosity of the liquid stream.

The relationship of the diameter of the pipe or distributor, the flow speed and flux is shown in the equation of:

$$Q = \frac{\pi \cdot d^2 \cdot u}{4}$$

wherein, is the flux of the liquid stream. As can be seen, once the diameter of the pipe or distributor is determined, the flow speed is determined by the flux of the liquid stream. It shall be further noted that a pressure is required to maintain the flux of the ejected flow. Therefore, the related parameters can be concluded as the diameter of pipe, the flux, the pressure and the Reynolds Number.

In the disclosed process, it is preferred that the flux of the ejected flow is in the range of 0.1-3000 $m^3$/hr, more preferably 0.1-800 $m^3$/hr. The pressure of the ejected flow is in the range of 30-3000 $kg/cm^2$, preferably 50-1000 $kg/cm^2$. The Reynolds Number Re of the ejected flow is in the range of 2000-200000, preferably 5000-150000, more preferably 8000-100000. Advantageously, at these Reynolds numbers, chemical homogeneity at the molecular level is achieved within the reaction zone before nucleation. Hence, it is possible to achieve a high super-saturation within a short period of time, and then form numerous nuclei in the first stage of the precipitation process, leading to produce very fine precipitate particles having a uniform particle size distribution. More advantageously, because chemical homogeneity at the molecular level is achieved within the reaction zone within a very short time frame, when synthesizing transition metal oxides, the formation of large aggregates of intermediate and the formation of intermediate species such as metal hydroxides may be inhibited and the precipitate consists mainly of transition metal oxide. This means that the transition metal oxides requires minimal to no sintering, or at least sintering at a low temperature.

In one embodiment, the agitator comprises a rotator-stator (or rotor-stator) disposed within an enclosed chamber, said rotator (or rotor) being rotatable about a longitudinal axis for imparting a high shear force to the reaction mixture. An exemplary agitator comprising a rotor-stator disposed within an enclosed chamber is described in U.S. Pat. No. 6,458,335 which is incorporated herein by reference.

In one embodiment, the agitator comprises a packed bed disposed within the enclosed chamber, said packed bed being rotatable about a longitudinal axis for imparting a shear force to the mixture in use. The packing may have a surface area in the range of about 100-3000 $m^2/m^3$. The packing can be such that it is structured packing or random packing. In one embodiment, the packing is a packing of the wire mesh type packing that can be made from a relatively inert material such as stainless steel, plain metal alloy, titanium metal or plastic.

In one embodiment the packing is substantially cylindrically-shaped and comprises at least one mesh layer. In one embodiment the packing is comprised of a plurality of overlapping mesh layers.

Applying a shear force to said mixing solutions may be undertaken by a shear means. In one embodiment, the shear means is in the form of a rolling mesh to form a cylindrical shear means, wherein the cylindrical section has sides formed by a plurality of overlapping mesh layers. The mesh may have a mesh size of about 0.05 mm to about 3 mm or about 0.1 mm to abut 0.5 mm. The mesh may have mesh porosity of at least 90%, or more than 95%.

In one embodiment, the packed bed is mounted on a shaft in the reaction zone and rotates in the reaction zone. As the packed bed rotates, said packing imparts high shear onto the injected liquids. In one embodiment, the rotating packed bed is cylindrically shaped and defines a hollow to accommodate the inlets for the liquids.

Advantageously, in order to meet the requirement of micro-mixing for reactants within a very short period of time, the agitator rotates in said reaction zone at a speed to achieve a high-gravity level $g_r$(m/s$^2$) sufficient to input high shear to said liquids in said zone. The high-gravity level can be regulated based on the equation of:

$$g_r = (2\pi N/60)^2 \cdot \frac{d_{in} + d_{out}}{2}$$

where N is the rotating speed of the agitator in rpm, $d_{in}$ is the inner diameter and $d_{out}$ is the outer diameter of the agitator. The high gravity level is selected from the group consisting of about 100 to about 15000 m·s$^{-2}$, about 500 to about 2000 m·s$^2$, about 1000 to about 5000 m·s$^2$, and about 800 to about 5000 m·s$^{-2}$. The use of such a strong high-gravity level of the agitator ensures that the liquids in the reaction zone are subjected to strong shear immediately upon injection into the reaction zone. In one embodiment, the metal salt solution and precipitant solution are injected into a hollow created by a vortex fluid flow as agitator rotates within the reaction zone. It is preferred that the liquids are injected directly onto the agitator and have an injection speed selected from the group consisting of at least 1 m·s$^{-1}$, at least 2 m·s$^{-1}$, at least 3 m·s$^{-1}$, at least 4 m·s$^{-1}$, and at least 5 m·s$^{-1}$.

In one embodiment, the metal salt solution and precipitant solution are injected into the reaction zone via a plurality of the inlets extending through a reaction chamber surrounding said reaction zone. The inlets may be arranged in number of ways depending on the structural design of the mixer. In one embodiment, the inlets are located in a distributor capable of distributing the metal salt solution and precipitant solution in the hollow created by vortex fluid flow within the reaction zone. The distributor may comprise a body having a plurality of inlets for each of the first and second liquids. Ejection of the metal salt solution and precipitant solution may alternately be ejected from the holes of the distributor. It is preferred that the liquid inlets eject to the inner edge of the agitator where the shear force is created.

In one embodiment, the metal salt solution and precipitant solution are respectively injected into the reaction zone via separate inlets.

The mixing unit may comprise at least one liquid outlet means for draining the mixture from the reaction zone when the mixing unit operated in either batch mode or continuous mode.

BRIEF DESCRIPTION OF DRAWINGS

The accompanying drawings illustrate the disclosed embodiments and serve to explain the principles of the disclosed embodiments. It is to be understood, however, that the drawings are designed for purposes of illustration only, and not as a definition of the limits of the invention.

SYSTEM FOR PRODUCTION OF PRECIPITATE PARTICLES

Figure 1:
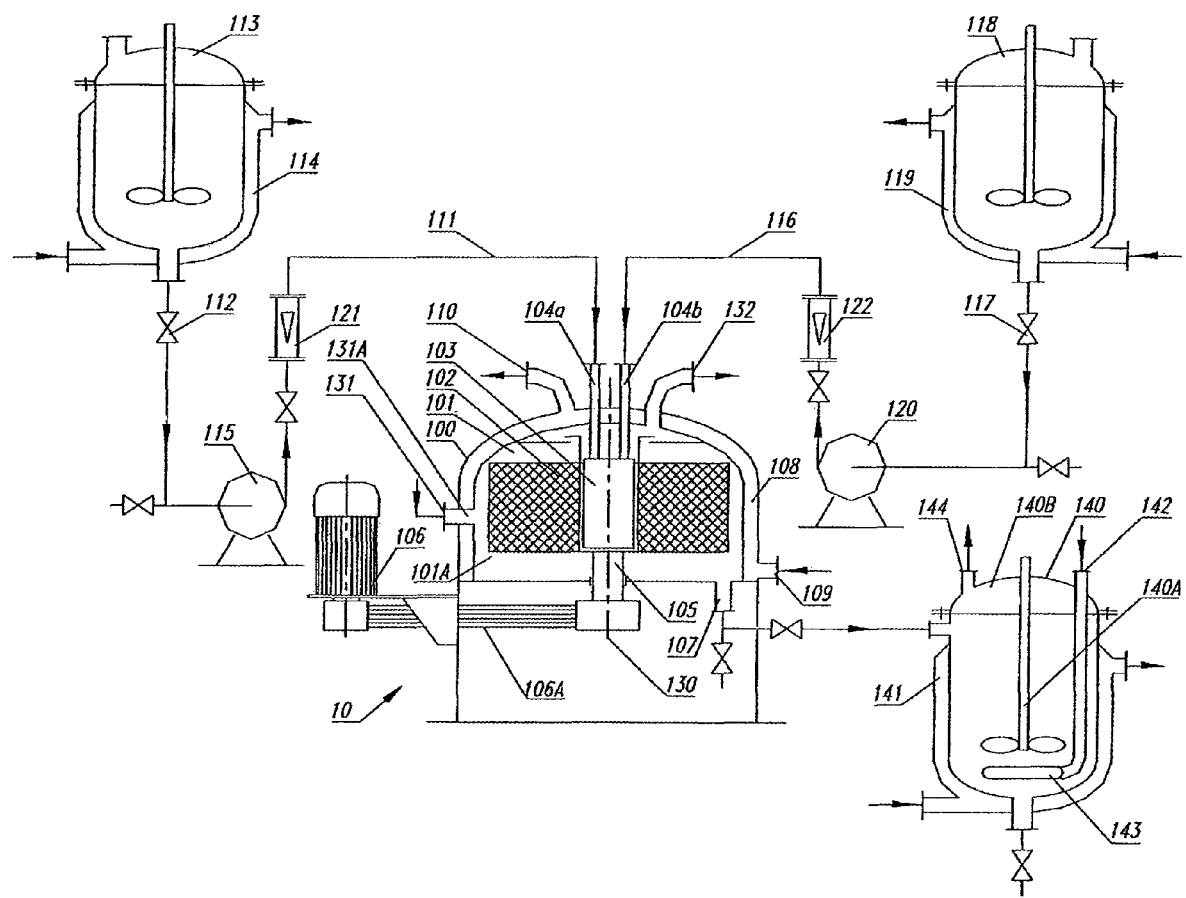
FIG. 1 shows a schematic drawing of a system for making the precipitate particles according to one disclosed embodiment.

Referring to FIG. 1, there is shown a system 10 for making nano-sized and micro-sized precipitate particles. The system comprises a molecular mixing unit 100. The molecular mixing unit 100 comprises a chamber 101 encompassing an enclosed space which defines a reaction zone 101A in which reaction of the metal salt solution and precipitant solution occurs. The chamber 101 also comprises an agitator in the form of a packed bed 102. The packed bed 102 imparts high shear to the reactant mixture within the reaction zone 101A. The packed bed 102 comprises a distributor 103 having two liquid inlets 104a and 104b for respectively feeding the metal salt solution and the precipitant solution into the reaction zone 101A.

The packed bed 102 is mounted on a rotatable shaft 105 disposed on a longitudinal axis represented by line 130. The packed bed 102 is mounted adjacent to the length of the distributor 103. The packed bed 102 is driven by a motor 106 via gear and pulley system 106A. In use, the motor 106 rotates the shaft 105 about the longitudinal axis 130.

The packed bed 102 is in fluid communication with the distributor 103. The distributor 103 comprises a body having conduits for transmission of liquid onto the packed bed 102. The distributor 103 is in fluid communication with inlet conduits 104a and 104b, which are respectively in fluid communication with metal salt solution feed tank 113 and precipitant solution feed tank 118.

The molecular mixing unit 100 also comprises an outlet conduit 107 for allowing formed precipitate particles to be removed from the chamber 101. The material of the molecular mixing unit is Titanium and alloys thereof.

The packed bed 102 is substantially cylindrical in shape and comprises a structured arrangement of a plurality of layers of wire mesh having a mesh size of 0.05 mm. The wire mesh is also made from titanium.

A temperature jacket 108 surrounds the chamber 101 to regulate the temperature within the reaction zone 101A. The temperature jacket 108 comprises a jacket inlet 109 for allowing heated fluid to enter and a jacket outlet 110 for allowing the fluid to exit from the jacket 108.

The inlet conduit 104a is linked by pipe 111 and valve 112 to the metal salt solution tank 113 where the metal salt solution is stored. A temperature jacket 114 surrounds the tank 113 to regulate the temperature of the metal salt solution within the tank 113. A pump 115 positioned along the pipe 111 pumps the metal salt solution from the storage tank 113 to the reaction zone 101A of the molecular mixing unit 100.

The inlet conduit 104b is linked by pipe 116 and valve 117 to the precipitant solution feed tank 118 where the precipitant solution is stored. A temperature jacket 119 surrounds the tank 118 to regulate the temperature within the tank 118. A pump 120 positioned along the pipe 116 to pump the precipitant solution from the storage tank 118 to the reaction zone 101A of the molecular mixing unit 100.

A pair of flow meters (121,122) are positioned along the pipes (111,116) to respectively regulate the flow rate of the metal salt solution and the precipitant solution to the inlet conduits 104a and 104b.

The outer shell of the molecular mixing unit shown in FIG. 1 includes a gas zone 131A above the reaction zone 101A, which may consist of an inert gas such as nitrogen, air or enriched oxygen. The gas zone 131A is created by pumping gas into the chamber 101 via gas-inlet 131 and gas is removed via gas-outlet 132.

The gas zone 131A consists of nitrogen when it is desired to isolate the reaction zone 101A from oxygen. The gas zone 131A consists of either air or enriched oxygen when it is desired that the reaction zone 101A be exposed to oxygen, thereby intensifying gas-liquid mass transfer. Hence, the gas zone 131A is able to function as a barrier for isolating the reaction zone 101A from oxygen and as a gas purge to contact air or oxygen with the reactant mixture. Whilst the gas zone 131A is shown in FIG. 1, in other embodiments, it may not be desirable to have the gas zone for certain compounds. Different particle morphologies can be achieved by injecting or purging different gases into the reaction zone.

The distributor 103 ejects the metal salt solution and the precipitant solution from the liquid feed inlets 104a and 104b into the inner surface of the packed bed 102. The metal salt solution and the precipitant solution are mixed together and react to form a mixture in the packed bed 102 and the chamber 101. The mixture passes through the packed bed 102 in a radial direction toward the outer surface of the packed bed 102.

In the packed bed 102, the mixture is subjected to high shear forces in the form of centrifugal forces created by the rotational motion of the shaft 105 and the packed bed 102 about the longitudinal axis 130. Accordingly, the mixture in the packed bed 102 is spread or split into very fine droplets threads or thin films in the micrometer to nanometer range, under the high gravity field created by centrifugal forces to thereby result in a high mass transfer and heat transfer rate between the metal salt and the precipitant solution. This also results in an intense micro-mixing between the metal salt and the precipitant solutions to react and form a highly uniformly-supersaturated solution in a very short time (ie less than 10 ms) in which, depending on the precipitant solution used, precipitates of nano-sized metal chalcogenide, metal oxide or metal hydroxide particles compounds are formed.

The magnitude of the centrifugal force exerted on the mixture within the packed bed 102 is dependent on the speed of rotation of the shaft 105 and the packed bed 102. The higher the speed of rotation of the shaft 105 and the packed bed 102, the larger the magnitude of the high gravity level or shear force acting on the mixture.

The nano-sized precipitate particles suspended in the mixture are removed from the chamber 101 via product outlet 107. The suspension of nano-sized precipitates particles is collected in the product tank 140.

The production tank 140 includes a gas blanket 140B residing above the slurry of suspended precipitate particles. The gas blanket 140B is formed by gas distributor 143 linked by a gas inlet 142 in the bottom of the tank and a gas outlet 144 in order to isolate the ageing or post-treatment process from the oxygen environment using nitrogen as inert protective gas or intensify oxidation reaction of precipitate by intensifying gas-liquid mass transfer.

The temperature of the precipitate slurry suspension is gradually increased to a given temperature via the temperature jacket 141. The suspension is also adequately stirred continuously via stirrer 140A. At the same time, the suspension can be neutralized and maintained at a set pH value by using acid or base. Thereafter, the precipitate slurry suspension is then washed and isolated to obtain the nano-sized precipitate particles.

EXAMPLES

Non-limiting examples of the disclosed process will be further described in greater detail by reference to the specific Examples below, which should not be construed as in any way limiting the scope of the invention.

In the following examples, the particle sizes of metal oxide or chalcogenide compounds were determined using JEOL-1010 TEM (Transmission Electron Microscopy) and JEOL-2010 HRTEM (High-Resolution Transmission Electron Microscopy). JEOL-1010 operated at 100 keV while JEOL- 2010 operated at 200 keV. Samples were prepared by sonicating the suspension of metal oxide or chalcogenide compounds for 20 minutes. A drop of the suspension was placed on a formvar carbon coated copper grid. The copper grids were allowed to dry by evaporation in air.

The secondary particle size distribution of metal chalcogenide compounds were determined by Horiba Dynamic Light Scattering Particle Size Analyzer LB-500. Samples were prepared by diluting the suspension of metal chalcogenide compounds with DI water or other organic solvent (i.e. alcohol), followed by sonication for 20 minutes.

The crystal structure identification was made by X-ray diffraction (Shimadzu XRD-6000 Powder Diffractometer) with Cu Kα radiation. Powder diffraction samples were prepared by drying the suspension of metal chalcogenide compounds in an oven at 80° C., followed by grinding the dried precipitate to a fine powder. The powder was then pressed into an aluminum sample.

In the following examples, the system to make the precipitate particles was the system 10 as described above with reference to FIG. 1.

Examples 1-8

Preparation of Nano-Sized Particles of Zinc Oxide

Example 1

Zinc chloride was dissolved in deionised (DI) water to form 5.0 L zinc salt solution with concentration of about 0.15 mol·L$^{-1}$ and then stored in the metal salt tank 113.

5.0 L NaOH solution with concentration of about 0.25 mol·L$^{-1}$ was prepared by dissolving anhydrous NaOH in DI water and then stored in tank 118. All reagents of chemical grade were used without further purification.

The above zinc chloride solution and NaOH solution were simultaneously pumped at a fixed flow rate of 0.4 L·min$^{-1}$ respectively for both solutions into the reaction zone 101A of the molecular mixing unit 100 via distributor 103. The reactants were held at room temperature (25° C.) during the mixing and reacting step. An immediate precipitate having an ivory-white colour formed and was suspended as a slurry.

The high-gravity level of the packed bed 102 was at a fixed level of 1579 m·s$^{-2}$. The injection speed for the two chloride solutions from liquid inlets 104a and 104b were 5 m·s$^{-1}$. The residence time in the molecular mixing unit 100 was fixed at about 20 s.

The slurry suspension was collected in the product tank 140 for post chemical aging process.

The temperature of the slurry suspension in the tank 140 was gradually increased from 25° C. to 75° C. The tank 140 was agitated during the temperature rise to promote heat transfer and to avoid sedimentation of the particles.

The pH value and the temperature of mixture in the product tank 140 were closely monitored. The pH value was maintained between 6-8 by adding 0.02 mol·L$^{-1}$ HCl during the gradual temperature rise. When the temperature of the suspension rose to 75° C., the suspension was left to cool to room temperature (25° C.) for about 10 minutes. Phase separation occurred in the suspension and the top liquid was decanted away. The remaining mixture was then filtered and washed with DI water. The washed precipitate was then collected and re-dispersed in DI water to form ZnO nanoparticles suspension.

Figure 2:
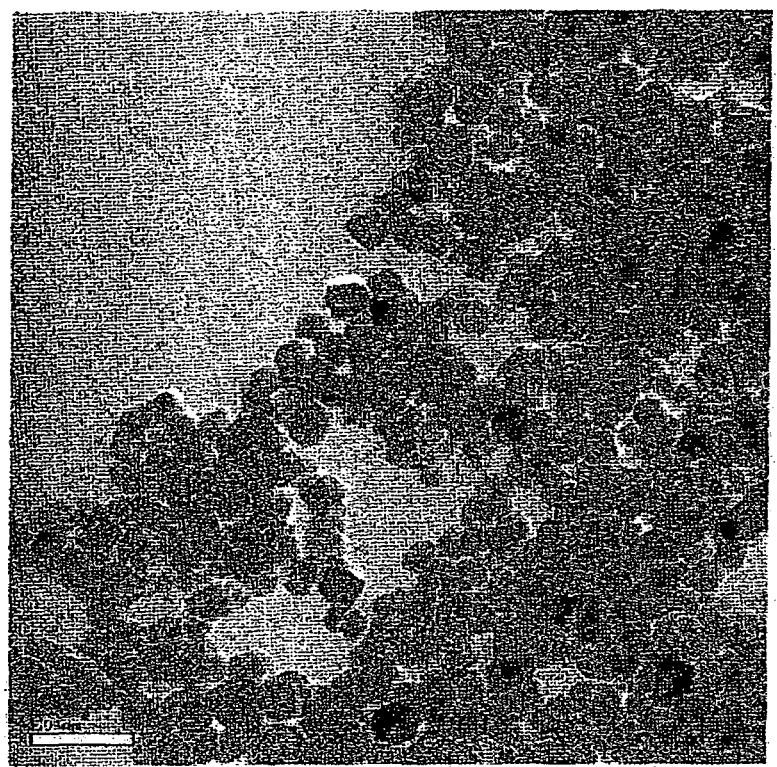
FIG. 2(a) shows a Transmission Electron Microscope (TEM) image of nano-sized ZnO particles prepared in Example 1 below, wherein the scale bar is 50 nm
FIG. 2B shows the High Resolution Transmission Electron Microscope (HRTEM) image of FIG. 2A, wherein the scale bar is 5 nm.
Figure 2:
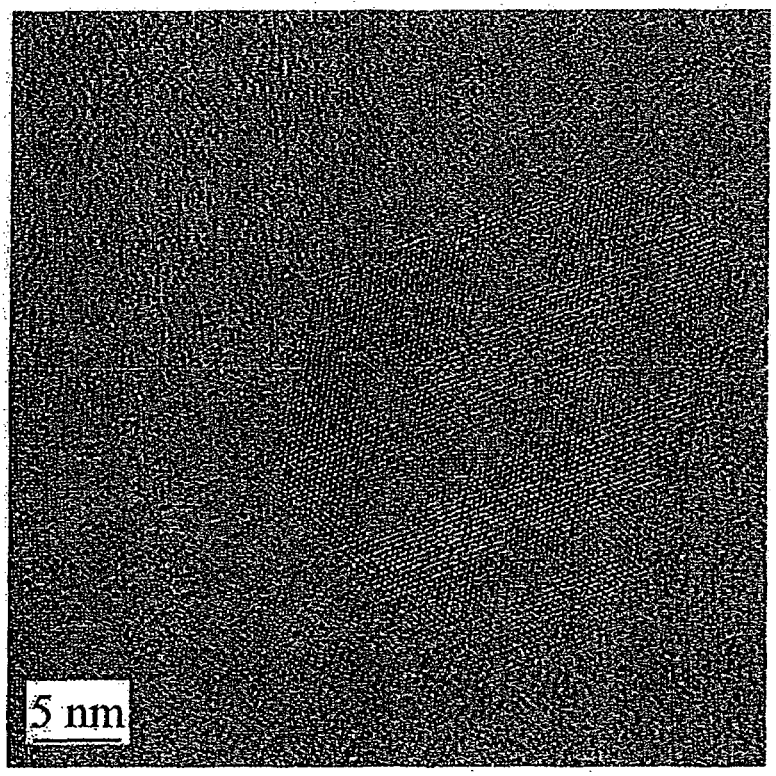

FIGS. 2(a) and 2(b) show TEM and HRTEM images of nano-sized ZnO particles prepared in this example. It can be seen from the figures that the average particle size of ZnO particles was about 15 nm and the morphology of the particles was near-hexagonal or prismy. The steepness ratio of the particles is 1.5. The secondary average particle size and particle size distribution of ZnO nanoparticles determined by Dynamic Light Scattering Particle Size Analyzer LB-500 revealed an average particle size of 90 nm having a half width of 30 nm, when water was used as dispersion medium.

Figure 3:
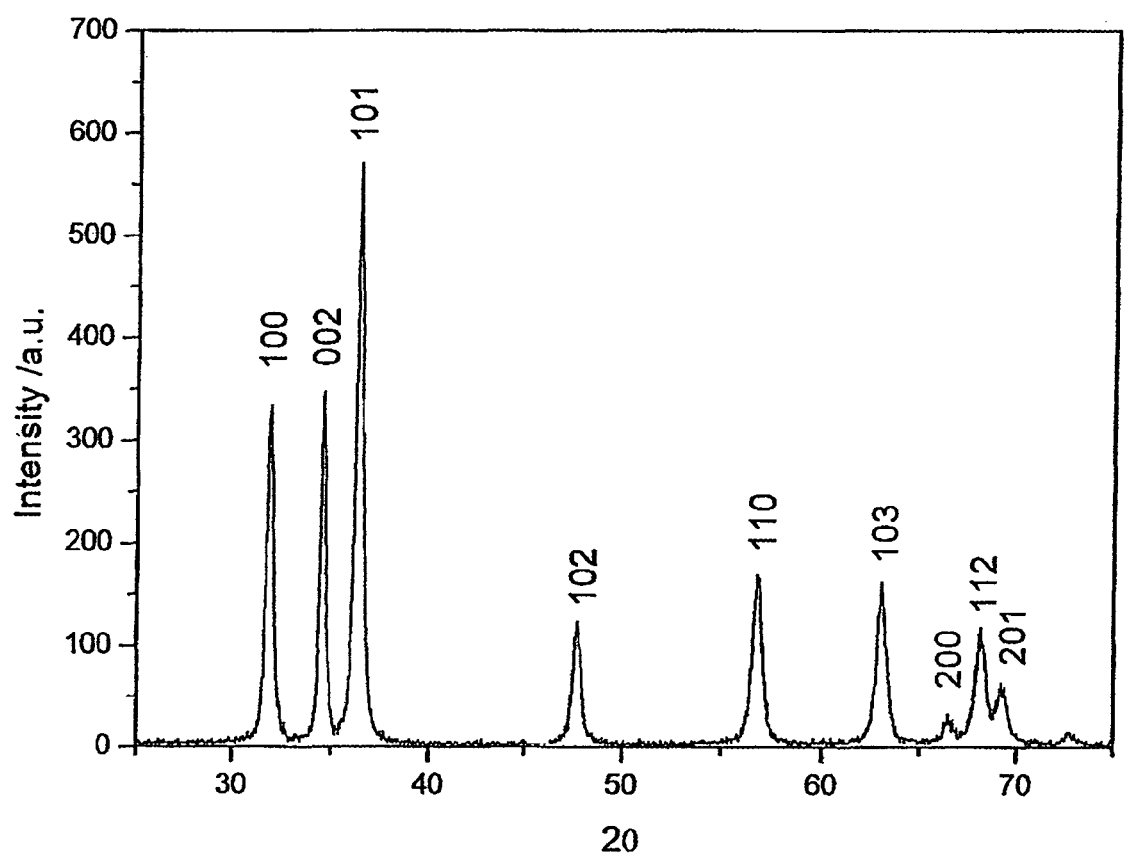
FIG. 3 shows an XRD pattern of the nano-sized ZnO particles prepared in example 1.

FIG. 3 shows the XRD pattern of the nano-sized ZnO particles prepared in this example. It can be seen from FIG. 3 that the crystal structure was almost exclusively related to a hexagonal wurtzite crystalline system (JCPDS 36-1451).

Example 2

Zinc chloride was dissolved in deionised (DI) water to form 5.0 L zinc salt solution with concentration of about 0.15 mol·L$^{-1}$ and then stored in the metal salt tank 113.

5.0 L NaOH solution with concentration of about 0.25 mol·L$^{-1}$ was prepared by dissolving anhydrous NaOH in DI water and then stored in tank 118. All reagents of chemical grade were used without further purification.

The above zinc chloride solution and NaOH solution were simultaneously pumped at a fixed flow rate of 0.4 L·min$^{-1}$ respectively for both solutions into the reaction zone 101A of the molecular mixing unit 100. The reactants were held at room temperature (25° C.) during the mixing and reacting step. An immediate precipitate having an ivory-white colour formed and was suspended as a slurry.

The high-gravity level of the packed bed 102 was at a fixed level of 1579 m·s$^{-2}$. The injection speed for the two chloride solutions from liquid inlets 104a and 104b were 5 m·s$^{-1}$. The residence time in the molecular mixing unit 100 was fixed at about 20 s.

The slurry suspension was collected in the product tank 140 for post aging process.

The temperature of the slurry suspension in the tank 140 was gradually increased from 25° C. to 75° C. The pH value and the temperature of mixture in the product tank 140 were closely monitored. The pH value was maintained between 6-8. The tank 140 was agitated during the temperature rise to promote heat transfer and avoid sedimentation of the particles.

When the temperature of the suspension rose to 75° C., the suspension was left to cool to room temperature for about 10 minutes. Phase separation occurred in the suspension and the top liquid was decanted away. The remaining mixture was then filtered and washed with DI water. The washed precipitate was then collected and re-dispersed in DI water to form ZnO nanoparticles suspension.

The average particle size of ZnO particles was about 13 nm and the morphology of the particles was near-hexagonal or prismy. The steepness ratio of the particles is 1.4. The secondary average particle size and particle size distribution of ZnO nanoparticles revealed an average particle size of 100 nm having a half width of 30 nm, when water was used as dispersion medium. The crystal structure was almost exclusively related to a hexagonal wurtzite crystalline system (JCPDS 36-1451).

Example 3

Zinc nitrate was dissolved in deionised (DI) water to form 5.0 L zinc salt solution with concentration of about 0.5 mol·L$^{-1}$ and then stored in the metal salt tank 113.

5.0 L sodium carbonate solution with concentration of about 0.6 mol·L$^{-1}$ was prepared by dissolving Na$_2$CO$_3$ in DI water and then stored in tank 118. All reagents of chemical grade were used without further purification.

The above zinc nitrate solution and $Na_2CO_3$ solution were simultaneously pumped at a fixed flow rate of 0.4 $L·min^{-1}$ respectively for both solutions into the reaction zone 101A of the molecular mixing unit 100. The reactants were held at room temperature (25° C.) during the mixing and reacting step. An immediate precipitate having an ivory-white colour formed and was suspended as a slurry.

The centrifugal acceleration of the packed bed 102 was at a fixed level of 1579 $m·s^{-2}$. The injection speed for the two chloride solutions from liquid inlets 104a and 104b were 5 $m·s^{-1}$. The residence time in the molecular mixing unit 100 was fixed at about 20 s.

The slurry suspension was collected in the product tank 140 for post filtration and drying process. Phase separation occurred in the suspension and the top liquid was decanted away. The white precipitate was then washed by 0.05M-1.0M ammonium solution for 3 times and ethanol for 3 times, The resulting filtrated cake was dried in a vacuum oven at 80° C. over 12 hrs and then calcined at 200° C. for 2 hrs.

The average particle size of ZnO particles in above powder was about 15 nm and the morphology of the particles was near-hexagonal or prismy. The steepness ratio of the particles is 1.6. An X-ray diffractogram of the dried sample indicated exclusively related to a hexagonal wurtzite crystalline system (JCPDS 36-1451).

Example 4

Zinc acetate dihydrate was dissolved in methanol to form 5.0 L zinc salt solution with concentration of about 1 $mol·L^{-1}$ and then stored in the metal salt tank 113 at 50° C.

5.0 L NaOH solution with concentration of about 2.0 $mol·L^{-1}$ was prepared by dissolving hydrous NaOH in methanol and then stored in tank 118 at 30° C. All reagents of chemical grade were used without further purification.

The above zinc acetate solution and NaOH solution were simultaneously pumped at a fixed flow rate of 0.4 $L·min^{-1}$ respectively for both solutions into the reaction zone 101A of the molecular mixing unit 100. The temperature of the molecular mixing unit 100 was held at about 60° C.) during the mixing and reacting step. An immediate precipitate having an ivory-white colour formed and was suspended as a slurry.

The high-gravity level of the packed bed 102 was at a fixed level of 1579 $m·s^2$. The injection speed for the two chloride solutions from liquid inlets 104a and 104b were 5 $m·s^{-1}$. The residence time in the molecular mixing unit 100 was fixed at about 20 s.

The slurry suspension was collected in the product tank 140. The suspension was left to cool to room temperature. Phase separation occurred in the suspension and the top liquid was decanted away. The remaining mixture was then filtered and washed with methanol three times. The washed precipitate was then collected and re-dispersed in DI water or other organic solvent to form ZnO nanoparticles suspension.

Hence, the disclosed process allows metal oxides, such as zinc oxide, to be directly synthesized without production of intermediate or by-product zinc hydroxide species. This means that zinc oxide made in the disclosed process does not have to be sintered or taken on other post-treatment process.

The average particle size of ZnO particles prepared in this example was about 6 nm. The steepness ratio of the particles is 1.4. The secondary average particle size and particle size distribution of ZnO nanoparticles revealed an average particle size of 30 nm having a half width of 10 nm when ethanol was used as dispersion medium. An X-ray diffractogram of the dried sample indicated that the crystal structure was almost exclusively related to a hexagonal wurtzite crystalline system (JCPDS 36-1451).

Example 5

ZnO particles were prepared in accordance with the process as described in example 2 except that the NaOH concentration was increased to 0.3 $mol·L^{-1}$, and the final aging temperature was increased to 85° C.

Figure 4:
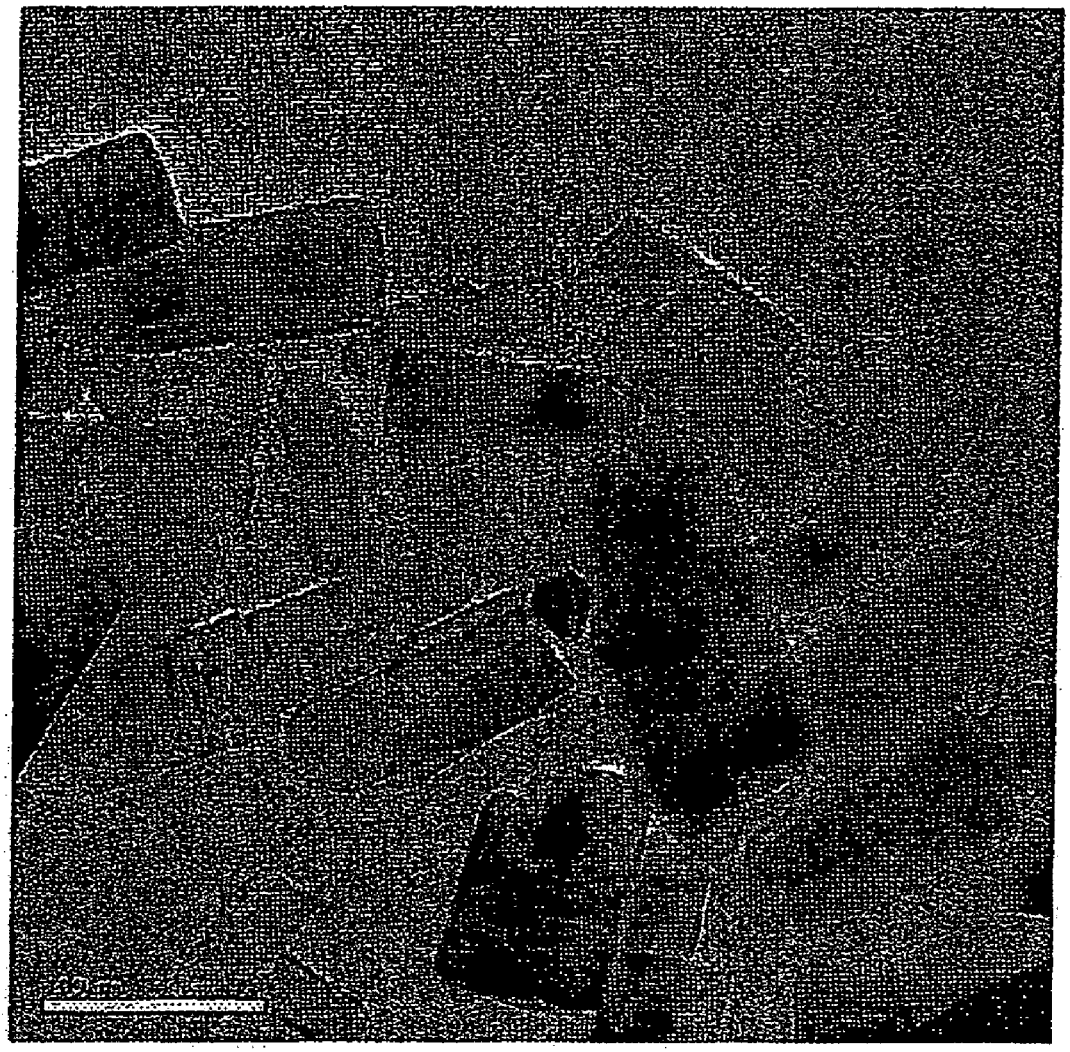
FIG. 4 shows a TEM image of nano-sized ZnO particles prepared in Example 5 below, wherein the scale bar is 100 nm.

The particle morphology and particle size of the nanoparticles was analyzed by TEM and could be seen from FIG. 4. The particle morphology was found to be rod shape. The particle size of short diameter was found to be 30 nm and having an aspect ratio of 2-4. An X-ray diffractogram of the dried sample indicated that the crystal structure was almost exclusively related to a hexagonal wurtzite crystalline system (JCPDS 36-1451).

Example 6

ZnO particles were prepared in accordance with the process as described in example 2 except that zinc sulfate heptahydrate ($ZnSO_4·7H_2O$) was used as the zinc salt, and the NaOH concentration was increased to 0.5 $mol·L^{-1}$.

The particle morphology and particle size of the nanoparticles was analyzed by TEM. The particle morphology was found to be near-hexagonal or prismy. The particle size was found to be 30 nm. The steepness ratio of the particles is 1.5. An X-ray diffractogram of the dried sample indicated that the crystal structure was almost exclusively related to a hexagonal wurtzite crystalline system (JCPDS 36-1451).

Example 7

ZnO particles were prepared in accordance with the process as described in example 1 except that zinc acetate dihydrate ($Zn(OAc)_2·7H_2O$) was used as the zinc salt and its concentration was 0.1 $mol·L^{-1}$, and the NaOH concentration was increased to 0.2 $mol·L^{-1}$.

Figure 5:
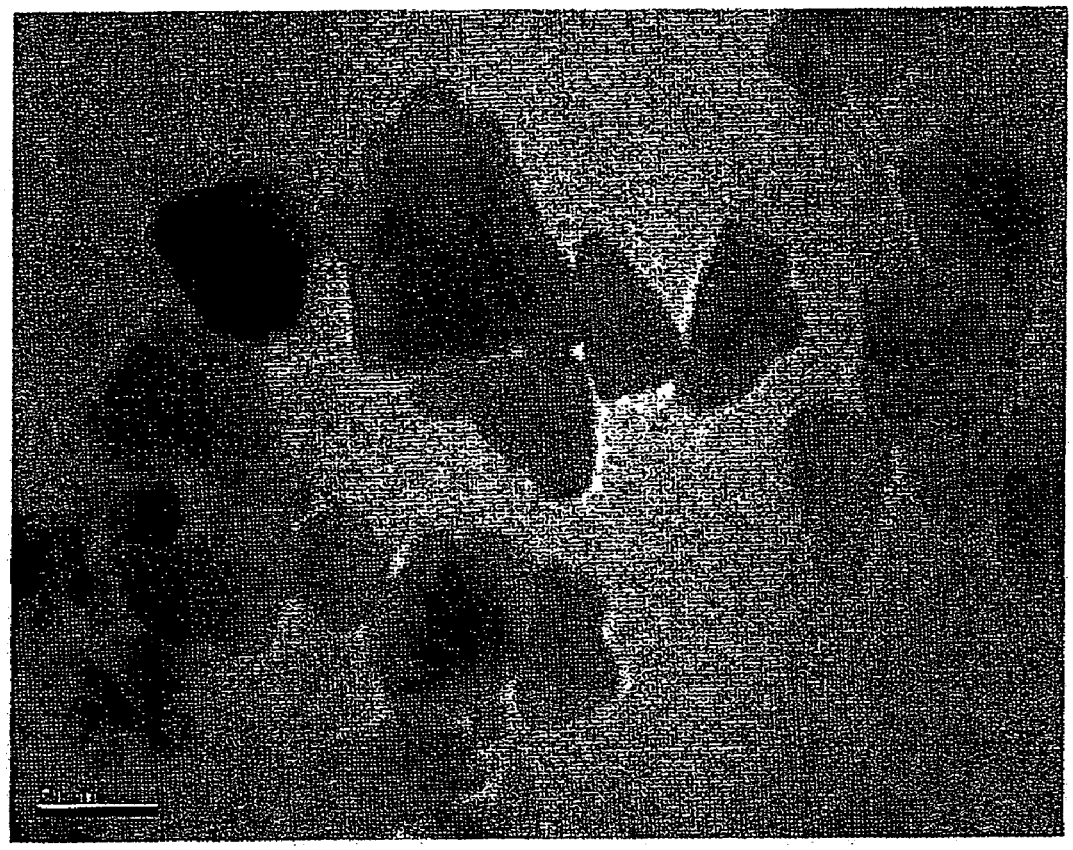
FIG. 5 shows a TEM image of nano-sized ZnO particles prepared in Example 7 below, wherein the scale bar is 50 nm.

The particle morphology and particle size of the nanoparticles was analyzed by TEM and is shown in FIG. 5. The particle morphology was found to be near-pyramid or half ellipsoidal. The particle size of short and long diameters was found to be 30 and 50 nm. An X-ray diffractogram of the dried sample indicated that the crystal structure was almost exclusively related to a hexagonal wurtzite crystalline system (JCPDS 36-1451).

Example 8

ZnO particles were prepared in accordance with the process as described in example 4 except that ethanol was used as a solvent to dissolve the zinc salt and the concentration of the zinc salt was 0.5 mol·L-1, and the NaOH concentration was changed to 1.05 $mol·L^{-1}$.

Particle morphology of the particle prepared in this example was near-pyramid or prism. The average particle size was about 10 nm. The steepness ratio of the particles is about 1.5. The secondary average particle size and particle size distribution of ZnO nanoparticles revealed an average particle size of 40 nm having a half width of 15 nm when ethanol was used as dispersion medium. An X-ray diffractogram of the dried sample indicated that the crystal structure was almost exclusively related to a hexagonal wurtzite crystalline system (JCPDS 36-1451).

Examples 9-16

Preparation of Nano-Sized Particles of Cerium Oxide

Example 9

$Ce(NO_3)_3 \cdot 6H_2O$ was dissolved in DI water to form 5.0 L cerium salt solution with a concentration of about 0.2 mol·L$^{-1}$ and then stored in the metal salt tank 113.

5.0 L NaOH solution with concentration of about 0.6 mol·L$^{-1}$ was prepared by dissolving anhydrous NaOH in DI water and then stored in the tank 118. All reagents of chemical grade were used without further purification.

The above $Ce(NO_3)_3$ solution and NaOH solution were simultaneously pumped at a fixed flow rate of 0.5 L·min$^{-1}$ respectively for both solutions into the reaction zone 101A of the molecular mixing unit 100 at 25° C. to mix and react via distributor 103. The immediate precipitate ranged from whitish-grey to red-violet-grey.

The high-gravity level of the packed bed 102 was at a fixed level of 1579 m·s$^{-2}$. The injection speed for the two chloride solutions from liquid inlets 104a and 104b were 4 m·s$^{-1}$. The residence time in the molecular mixing unit 100 was fixed at about 25 s.

The slurry suspension was removed from the molecular mixing unit 100 and collected in the product tank 140. The temperature of the suspension was rapidly increased to 85° C. with vigorous air sparging from the gas distributor 143 and continuous-stirring by agitator 140A.

The pH value and the temperature of mixture were closely monitored. The suspension was maintained at 85° C. for 2 hours. During this time, the slurry changed from violet-grey to light malt-brown to white-yellow.

At the end of 2 hours, the slurry suspension was left to cool to room temperature (about 25° C.). Phase separation occurred in the suspension and the top liquid was decanted away.

The remaining slurry mixture was filtered and washed with DI water. The washed precipitate was then collected and re-dispersed in DI water to obtain the $CeO_2$ nano-sized particles suspension.

Figure 6:
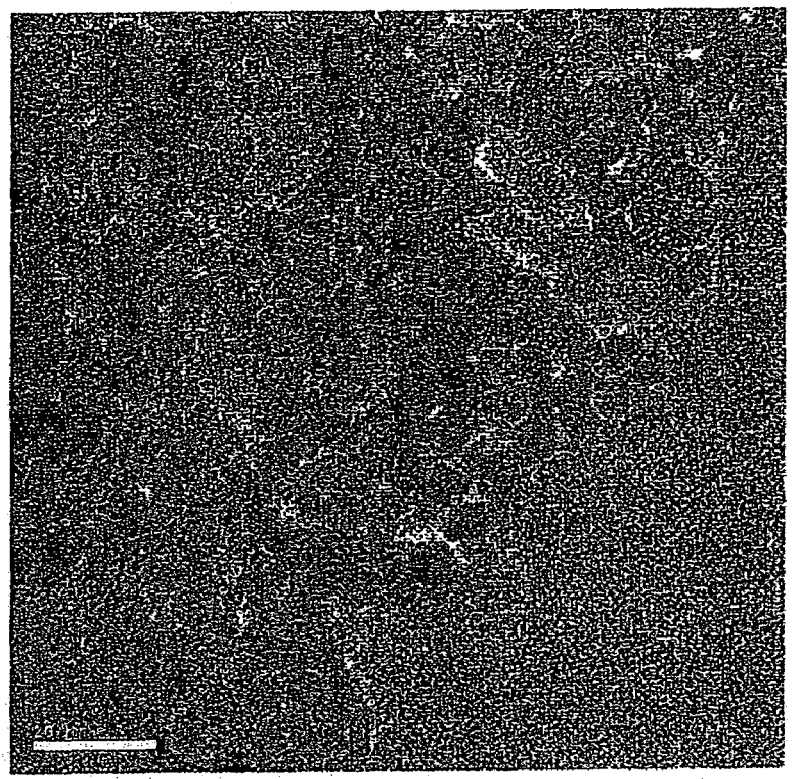
FIG. 6(a) shows a TEM image of nano-sized $CeO_2$ particles prepared in Example 9, wherein the scale bar is 20 nm
FIG. 6(b) shows the HRTEM image of FIG. 6A, wherein the scale bar is 10 nm.
Figure 6:
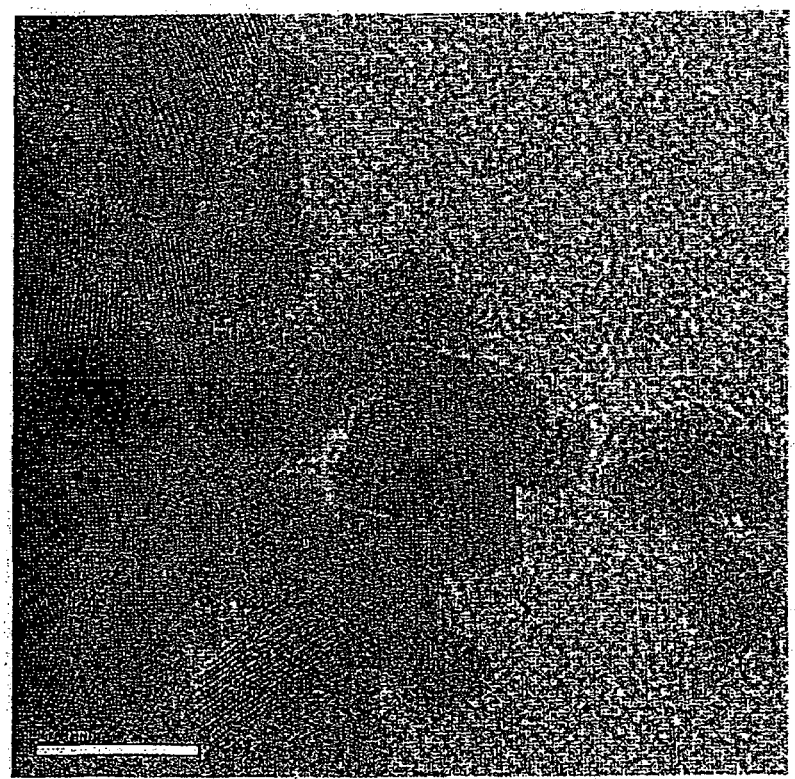

FIGS. 6(a) and 6(b) show TEM and HRTEM images of the nano-sized $CeO_2$ particles prepared in this example. It can be seen from the figures that the average particle size of $CeO_2$ particles was about 6 nm and the morphology of the particles was cubic or near-hexagonal. The steepness ratio of the particles is 1.4. The secondary average particle size and particle size distribution of $CeO_2$ nano-particles determined by Dynamic Light Scattering Particle Size Analyzer LB-500 revealed an average particle size of 30 nm having a half width of 15 nm.

Figure 7:
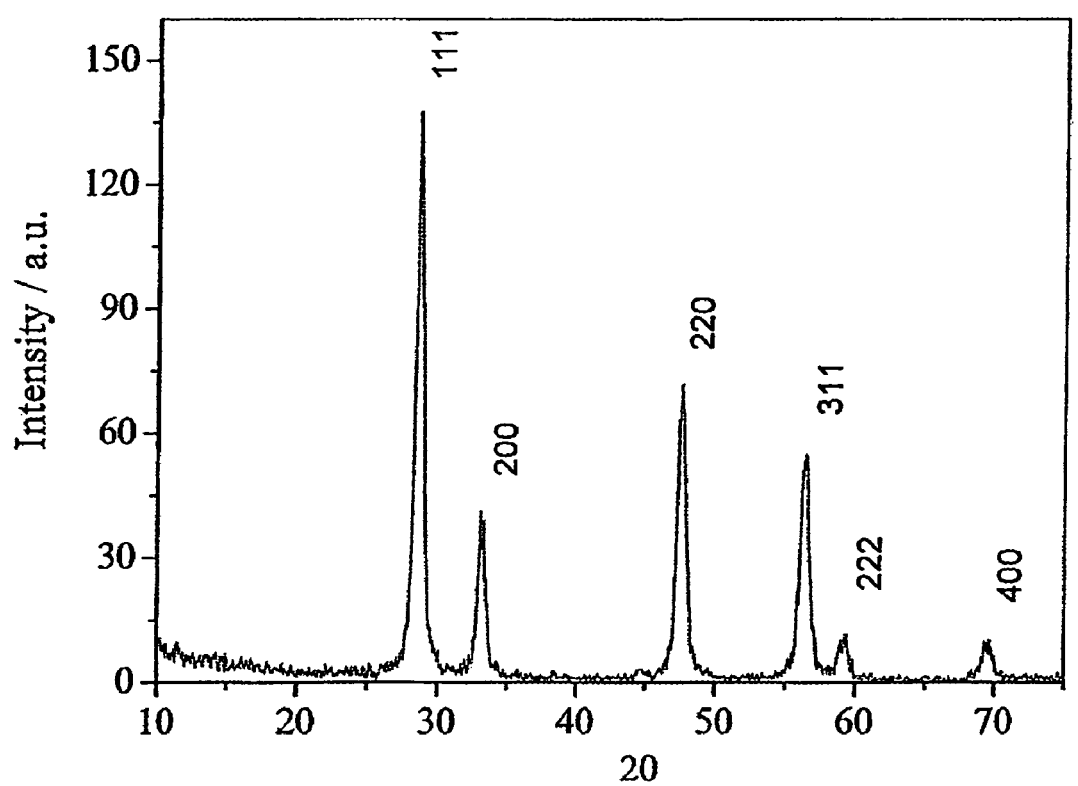
FIG. 7 shows the XRD pattern of nano-sized $CeO_2$ particles prepared in Example 9.

FIG. 7 shows an XRD pattern of nano-sized $CeO_2$ particles prepared in this example. It can be seen from FIG. 7 that the crystal structure could exclusively index to typical face-centered-cubic fluorite structure.

Example 10

$CeO_2$ particles were prepared in accordance with the process as described in example 9 except for the following:
1. The basic solution was changed to ammonia solution (1.5 mol·L$^{-1}$)
2. The reaction temperature was changed to 85° C.
3. The aging time for suspension in product tank was changed to 30 minutes.

Figure 8:
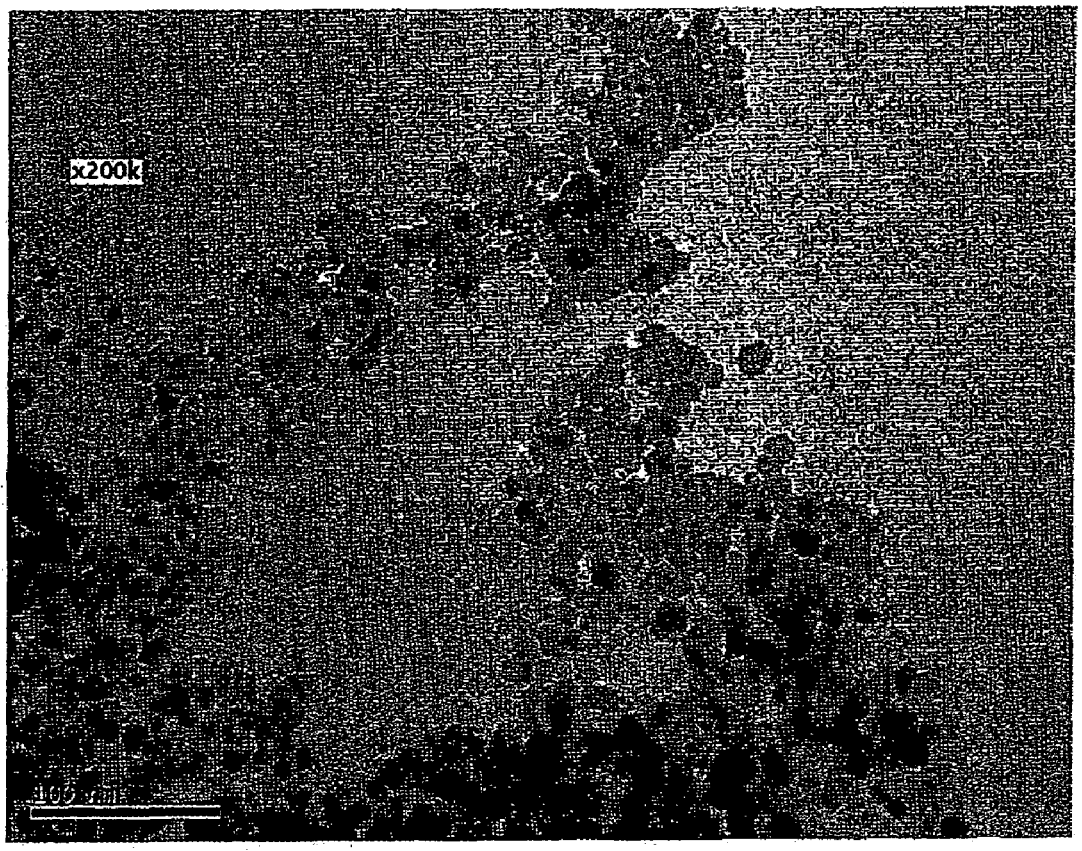
FIG. 8 shows a TEM image of nano-sized $CeO_2$ particles prepared in Example 10, wherein the scale bar is 100 nm.

FIG. 8 shows a TEM image of the nano-sized $CeO_2$ particles prepared in this example. It can be seen from FIG. 8 that the average particle size of $CeO_2$ particles was about 8 nm and the morphology of the particles was cubic or near-hexagonal. The steepness ratio of the particles is 1.5. The secondary average particle size and particle size distribution of $CeO_2$ nano-particles determined by Dynamic Light Scattering Particle Size Analyzer LB-500 revealed an average particle size of 40 nm having a half width of 16 nm.

Figure 10:
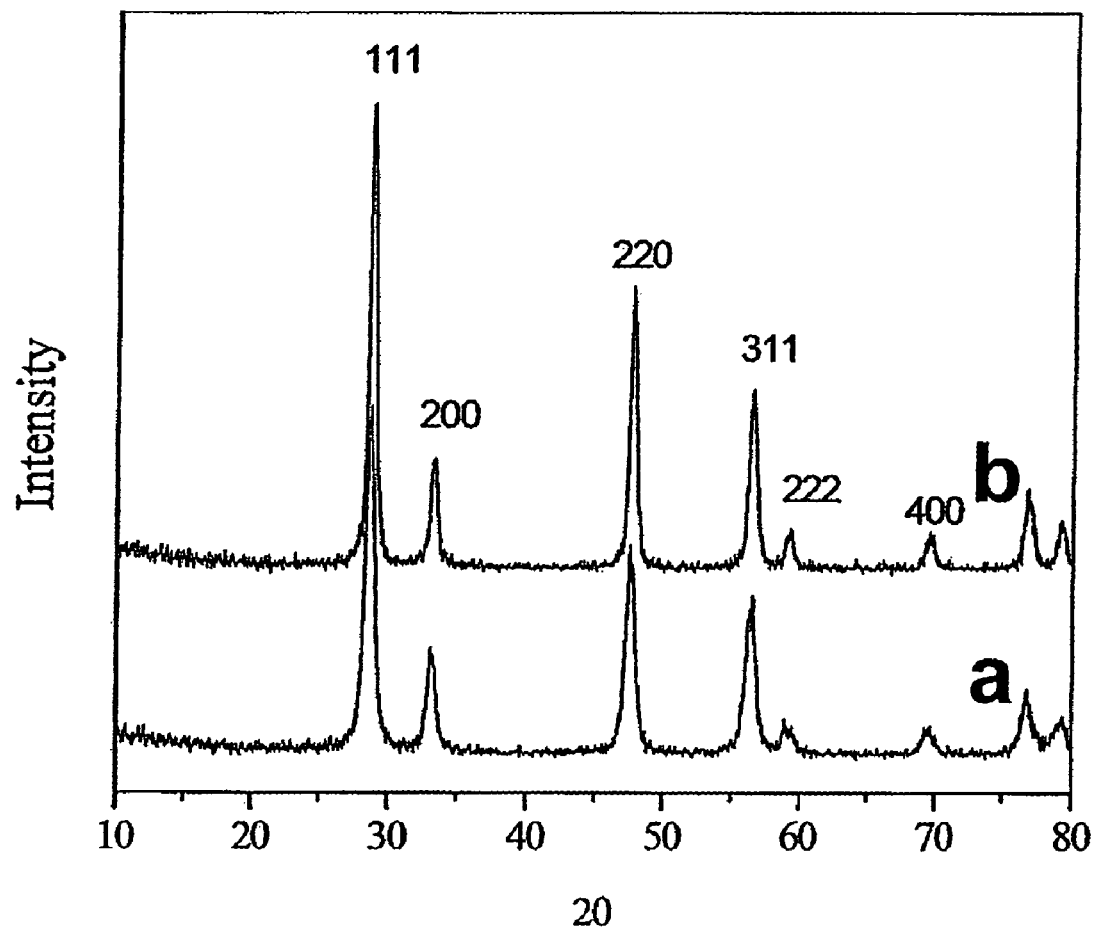
FIG. 10(a) shows the XRD pattern of nano-sized $CeO_2$ particles prepared in Example 10 and FIG. 10(b) shows the XRD pattern of $CeO_2$ particles prepared in Example 12.

FIG. 10a shows an XRD pattern of nano-sized $CeO_2$ particles prepared in this example. It can be seen from FIG. 10a that the crystal structure could exclusively index to typical face-centered-cubic fluorite structure.

Example 11

$CeO_2$ particles were prepared in accordance with the process as described in example 10 except that the concentration of ammonia solution was changed to 3.0 mol·L$^{-1}$.

TEM analysis result shows that the average particle size of $CeO_2$ particles was about 5 nm and the morphology of the particles was cubic or near-hexagonal. The steepness ratio of the particles is 1.4. The secondary average particle size and particle size distribution of $CeO_2$ nano-particles determined by Dynamic Light Scattering Particle Size Analyzer LB-500 revealed an average particle size of 28 nm having a half width of 10 nm. XRD analysis result shows that the crystal structure for the product in this example could exclusively index to typical face-centered-cubic fluorite structure.

Example 12

$CeO_2$ particles were prepared in accordance with the process as described in example 10 except that the reaction and aging temperature was changed to 60° C. and the aging time for suspension in product tank 140 was changed to 30 minutes.

Figure 9:
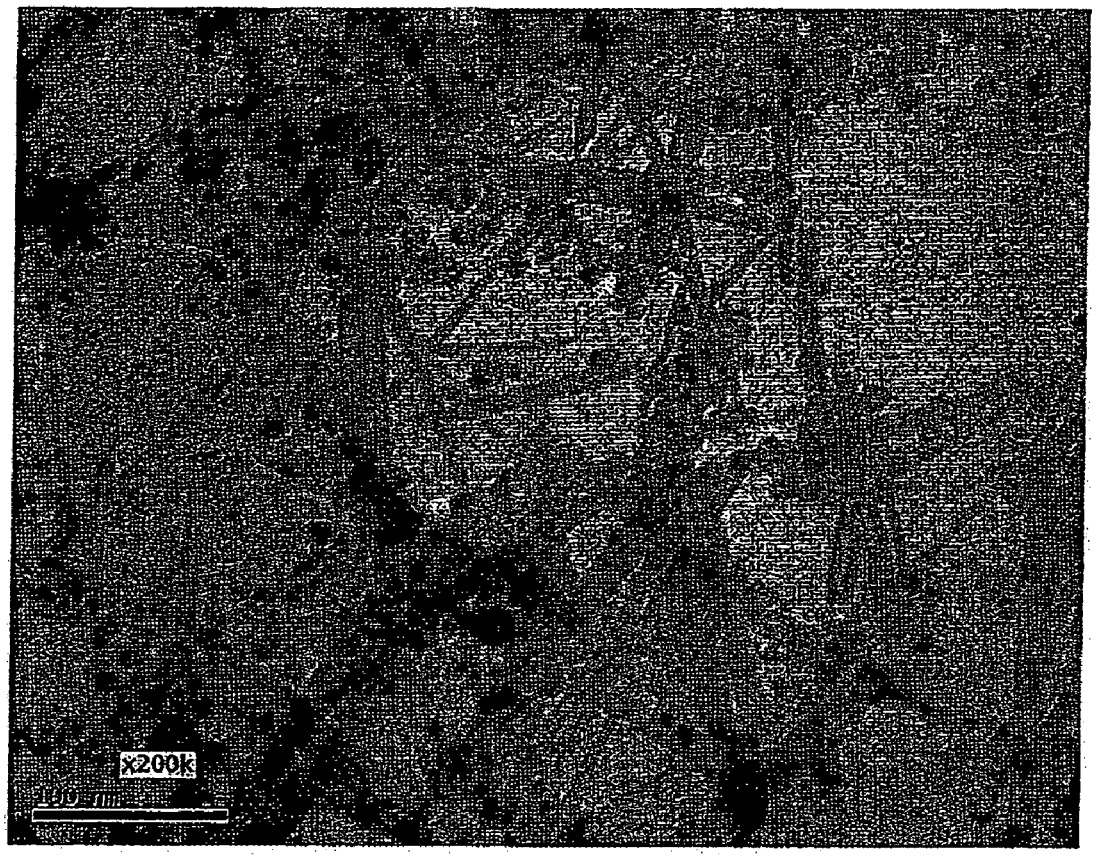
FIG. 9 shows a TEM image of nano-sized $CeO_2$ particles prepared in Example 12, wherein the scale bar is 100 nm.

FIG. 9 shows a TEM image of the nano-sized $CeO_2$ particles prepared in this example. It can be seen from FIG. 9 that the products contains a lot of need-like particles, and there are some tiny nanoparticles adhering to the needles. The needle particle obtained are about 8-15 nm in width, and more than 200 nm in length.

FIG. 10b shows an XRD pattern of nano-sized $CeO_2$ particles prepared in this example. It can be seen from FIG. 10a that the crystal structure could exclusively index to typical fluorite structure.

Example 13

$CeO_2$ particles were prepared in accordance with the process as described in example 10 except that the reaction and aging temperature was changed to 20° C. and the aging time for suspension in product tank 140 was changed to 5 hrs.

TEM analysis result shows that the products are mostly need-like, and there are few tiny nanoparticles adhering to the needles. The needle particles obtained are about 5-12 nm in width, and more than 220 nm in length. XRD analysis result shows that the crystal structure for the product in this example could exclusively index to typical fluorite structure.

Example 14

$CeO_2$ particles were prepared in accordance with the process as described in example 9 except that air sparging was substituted by oxygen blowing and aging time change to 15 minutes.

TEM analysis result shows that the average particle size of $CeO_2$ particles was about 5 nm and the morphology of the particles was cubic or near-hexagonal. The steepness ratio of the particles is 1.3. The secondary average particle size and particle size distribution of $CeO_2$ nano-particles determined by Dynamic Light Scattering Particle Size Analyzer LB-500 revealed an average particle size of 28 nm having a half width of 10 nm. XRD analysis result shows that the crystal structure for the product in this example could exclusively index to typical face-centered-cubic fluorite structure.

Example 15

$CeO_2$ particles were prepared in accordance with the process as described in example 9 except that the aging process occur in batchwise molecular mixing unit, and aging time change to 10 minutes.

TEM analysis result shows that the average particle size of $CeO_2$ particles was about 5 nm and the morphology of the particles was cubic or near-hexagonal. The steepness ratio of the particles is 1.3. The secondary average particle size and particle size distribution of $CeO_2$ nano-particles determined by Dynamic Light Scattering Particle Size Analyzer LB-500 revealed an average particle size of 25 nm having a half width of 10 nm. XRD analysis result shows that the crystal structure for the product in this example could exclusively index to typical face-centered-cubic fluorite structure.

Example 16

$CeO_2$ particles were prepared in accordance with the process as described in example 10 except for the following:
1. The reaction temperature was changed to 60° C.
2. Another reactant ($H_2O_2$: 0.22 $mol \cdot L^{-1}$) was introduced into the reaction zone 101A of the molecular mixing unit 100 via distributor 103 with a rate of 0.25 $L \cdot min^{-1}$.
3. No air or oxygen blowing was introduced at the aging process.

The color of the suspension after the reaction out from the reaction zone was Orange. During the aging process, the color of the suspension changed from orange to violet-grey and subsequently to white-yellow.

Figure 11:
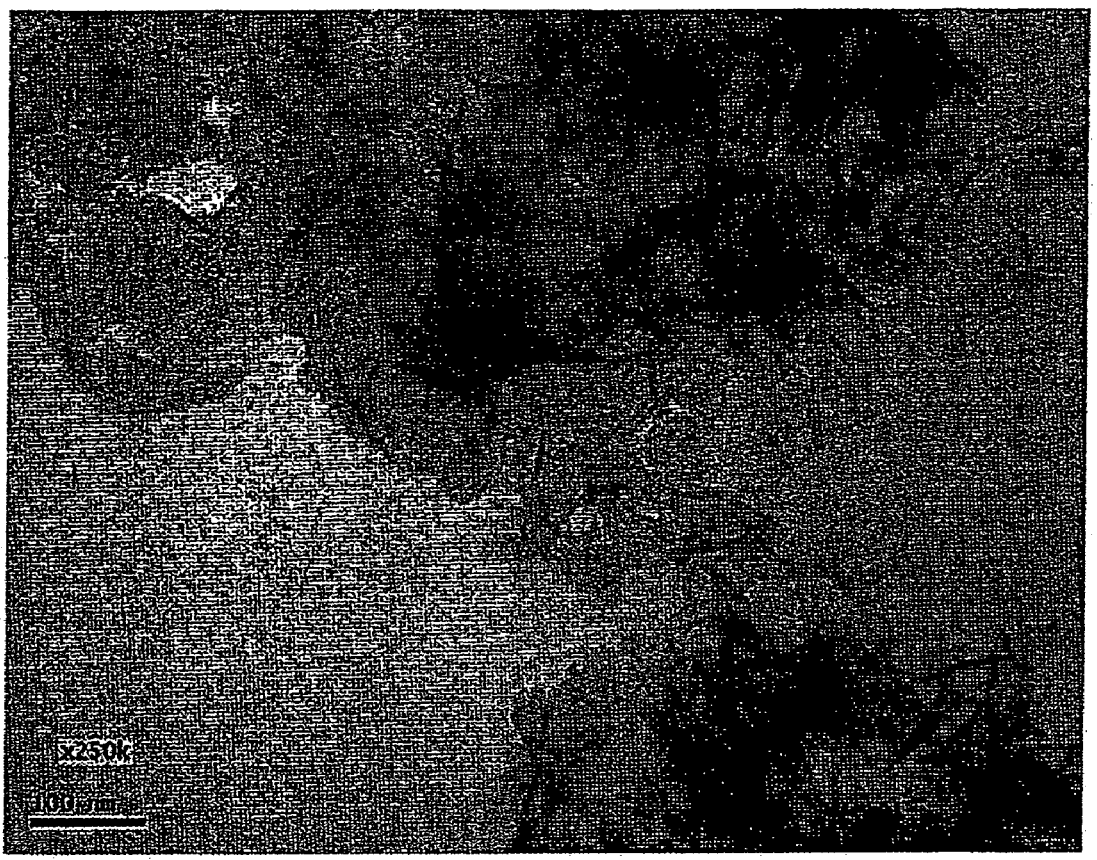
FIG. 11 shows a TEM image of nano-sized $CeO_2$ particles prepared in Example 16 below, wherein the scale bar is 100 nm.

FIG. 11 shows a TEM image of the nano-sized $CeO_2$ particles prepared in this example. It can be seen from FIG. 11 that the products the morphology of the particles was near-flake or sheet with the thickness of 2-4 nm and more than 100 nm in width. XRD analysis result shows that the crystal structure for the product in this example could exclusively index to typical fluorite structure.

Examples 17-20

Preparation of Nano-Sized Particles of Iron Oxide

Example 17

DI water, degassed with nitrogen gas for half an hour was used to prepare the reactant solutions. $FeCl_2 \cdot 4H_2O$ and $FeCl_3$ were dissolved in 0.12 $mol \cdot L^{-1}$ HCl solution to form 5.0 L iron salt solution with a total concentration of iron ions about 0.25 $mol \cdot L^{-1}$ and then stored in the metal salt tank 113, where the ratio $Fe^{2+}:Fe^{3+}=1:2$.

5.0 L $NH_3 \cdot H_2O$ solution with concentration of about 1.34 $mol \cdot L^{-1}$ was prepared by dissolving concentrated $NH_3 \cdot H_2O$ in DI water and then stored in the tank 118. All reagents of chemical grade were used without further purification.

The above iron salt solution and $NH_3$—$H_2O$ solution were simultaneously pumped with fixed flow rate of 0.5 $L \cdot min^{-1}$ respectively for both solutions into the reaction zone 101A of the molecular mixing unit 100 via distributor 103 about 25° C. during the mixing and reacting. The black precipitate formed immediately. During the reaction, the molecular mixing unit 100 was protected by nitrogen gas by pumping gas into the chamber 101 via gas-inlet 131 and gas is removed via gas-outlet 132.

The high-gravity level of the packed bed 102 was at a fixed level of 2000 $m \cdot s^{-2}$. The injection speed for the two chloride solutions from liquid inlets 104a and 104b were 5 $m \cdot s^{-1}$. The residence time in the molecular mixing unit 100 was fixed at about 20 s.

The slurry suspension was removed from the molecular mixing unit 100 and collected in the product tank 140. The production tank was also protected by using nitrogen as inert protective gas.

Phase separation occurred in the suspension and the top liquid was decanted away. Then the pH value was adjusted with HCl to pH 7.

The remaining mixture was centrifuged and washed with DI water. The washed precipitate was then collected and re-dispersed in DI water to form $Fe_3O_4$ nanoparticles suspension.

Figure 12:
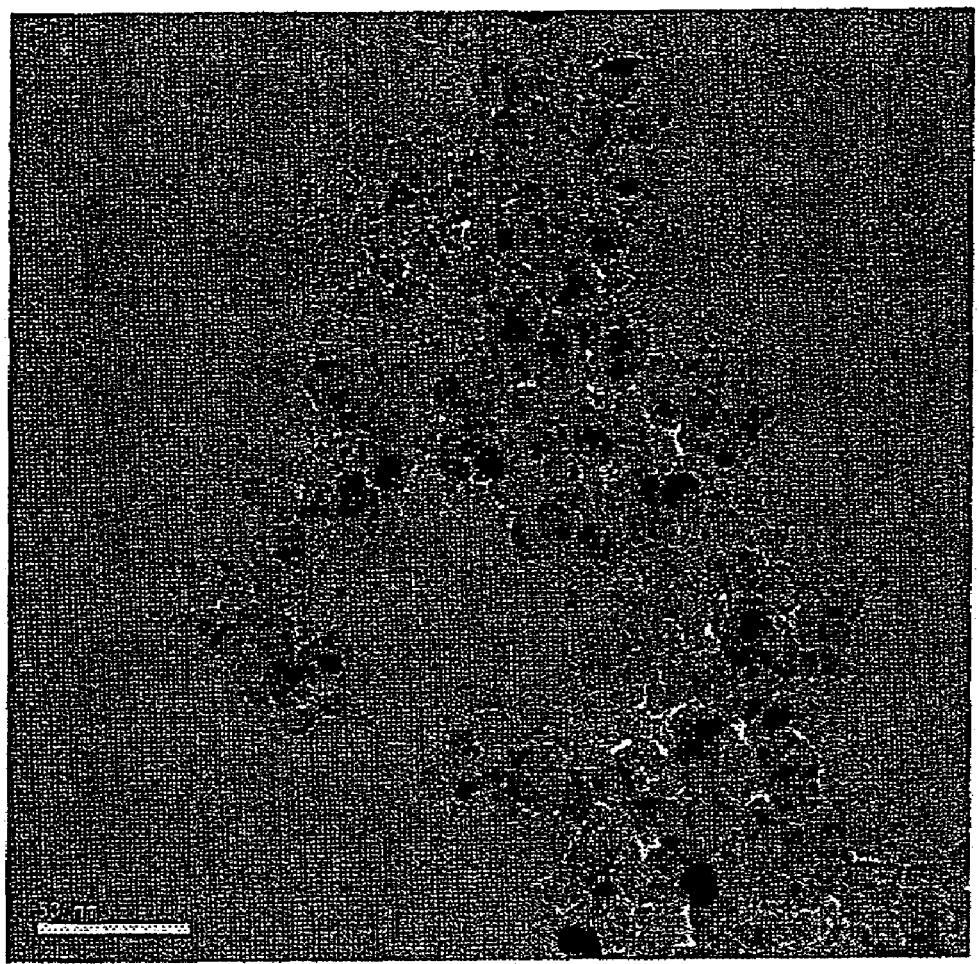
FIG. 12 shows a TEM image of nano-sized $Fe_3O_4$ particles prepared in Example 17.

FIG. 12 shows a TEM image of nano-sized $Fe_3O_4$ particles prepared in this example. It can be seen from FIG. 12 that the average particle size of $Fe_3O_4$ particles was about 9.4 nm and the morphology of the particles was spherical. The steepness ratio of the particles is 1.4. The secondary average particle size and particle size distribution of $Fe_3O_4$ nanoparticles determined by Dynamic Light Scattering Particle Size Analyzer LB-500 revealed to be an average particle size of 50 nm having a half width of 20 nm.

Figure 13:
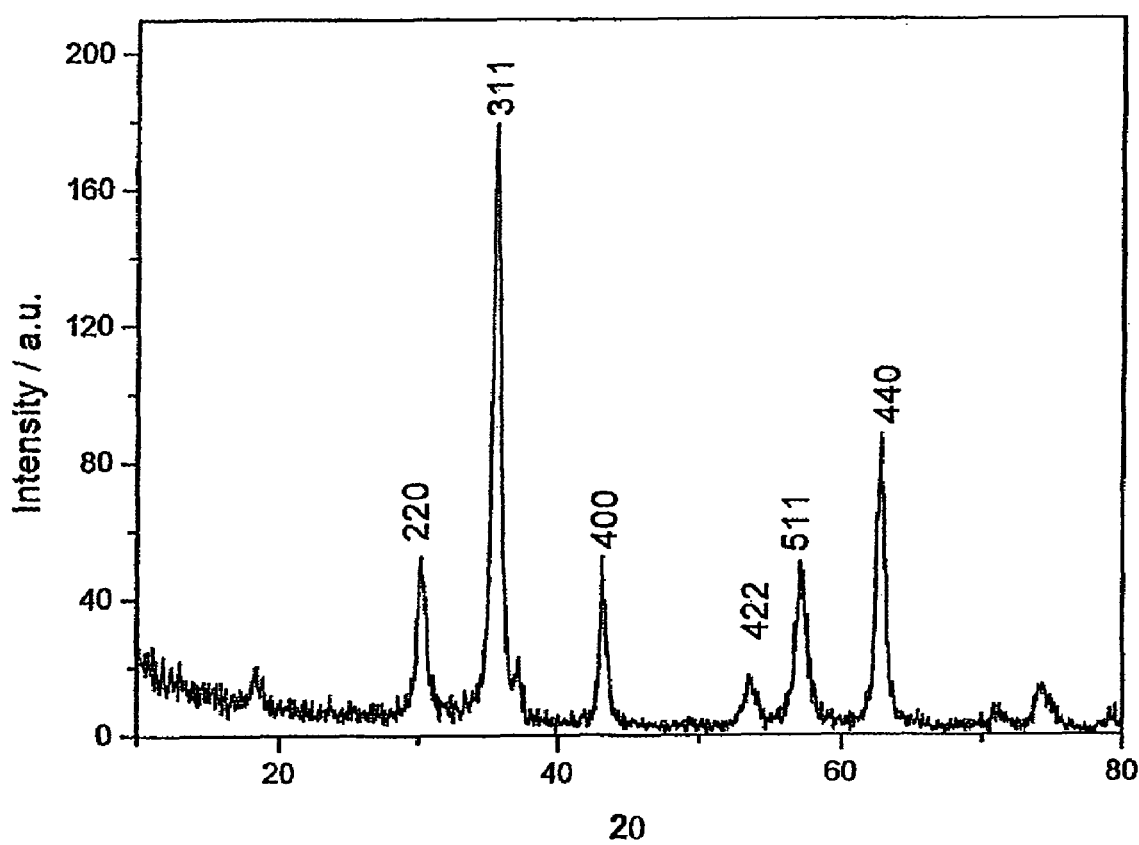
FIG. 13 shows the XRD pattern of nano-sized $Fe_3O_4$ particles prepared in Example 17.

FIG. 13 shows the XRD pattern of nano-sized $Fe_3O_4$ particles prepared in this example. It can be seen from FIG. 13 that the crystal structure almost exclusively corresponded to an magnetite crystalline system.

Example 18

$FeCl_2 \cdot 4H_2O$ and $FeCl_3$ were dissolved in 0.12 $mol \cdot L^{-1}$ HCl solution to form 5.0 L iron salt solution with a total concentration of iron ions about 0.25 $mol \cdot L^{-1}$ and then stored in the metal salt tank 113, where the ratio $FeCl_2:FeCl_3=1:2$.

5.0 L NaOH solution with concentration of about 5.4 $mol \cdot L^{-1}$ was prepared by dissolving anhydrous NaOH in DI water and then stored in the tank 118. All reagents of chemical grade were used without further purification.

The above iron salt solution and NaOH solution were simultaneously pumped with fixed flow rate of 0.5 $L \cdot min^{-1}$ respectively for both solutions into the reaction zone 101A of the molecular mixing unit 100 via distributor 103 about 25° C. during the mixing and reacting. The black precipitate formed immediately.

The high-gravity level of the packed bed 102 was at a fixed level of 1579 $m \cdot s^{-2}$. The injection speed for the two chloride solutions from liquid inlets 104a and 104b were 5 $m \cdot s^{-1}$. The residence time in the molecular mixing unit 100 was fixed at about 20 s.

The slurry suspension was removed from the molecular mixing unit 100 and collected in the product tank 140.

Phase separation occurred in the suspension and the top liquid was decanted away. Then centrifuge the black sediment and wash twice with DI water.

Re-disperse the black centrifuge sediment in DI water and the pH value was adjusted with HCl to pH 3.

Then vigorously aerated via gas distributor 143 and stirred via the stirrer 140A the black slurry for 8 hr at 80-90° C. The black slurry should have turned reddish-brown.

The pH of the reddish-brown slurry was adjusted to 7. The slurry was then collected and re-dispersed in DI water to form $Fe_2O_3$ nanoparticles suspension.

Figure 14:
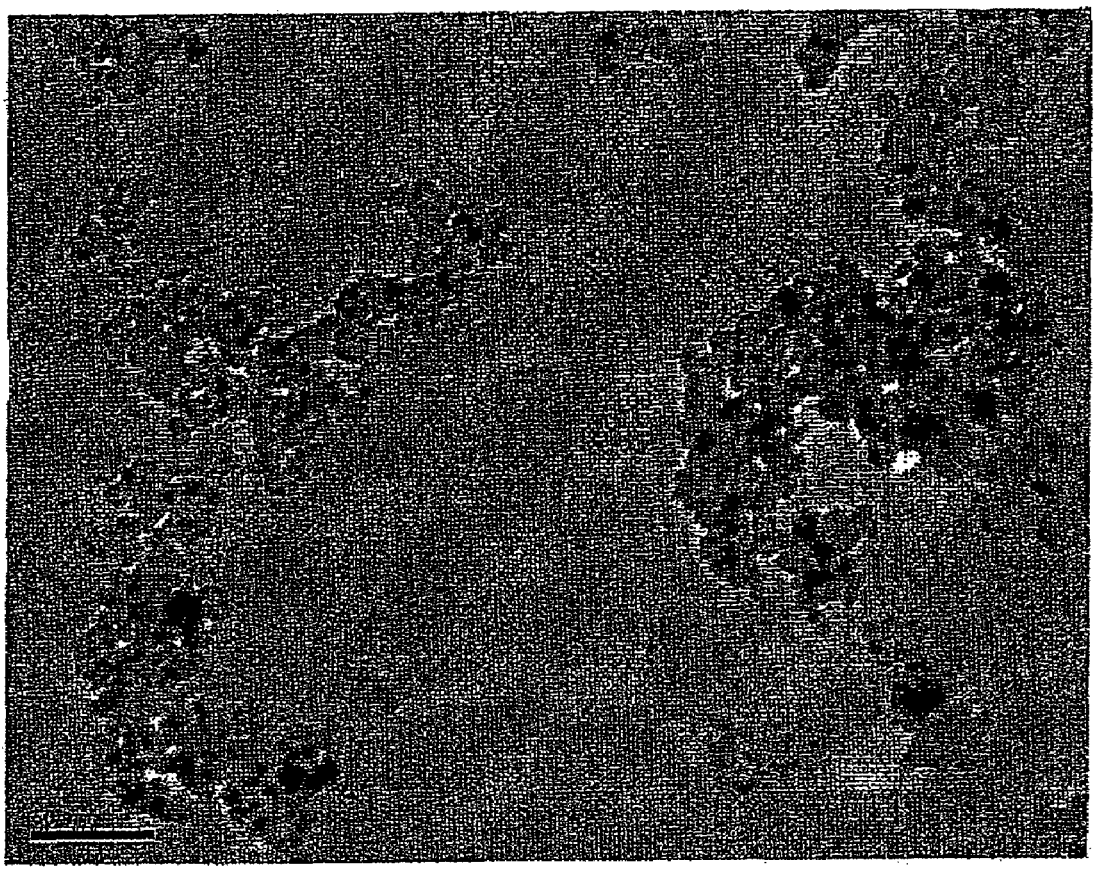
FIG. 14 shows a TEM image of nano-sized $Fe_2O_3$ particles prepared in Example 18.

FIG. 14 shows a TEM image of nano-sized $Fe_2O_3$ particles prepared in this example. It can be seen from FIG. 14 that the average particle size of $Fe_2O_3$ particles was about 7 nm and the morphology of the particles was spherical. The steepness ratio of the particles is 1.4. The secondary average particle size and particle size distribution of $Fe_3O_4$ nanoparticles determined by Dynamic Light Scattering Particle Size Analyzer LB-500 revealed to be an average particle size of 60 nm having a half width of 20 nm.

Figure 15:
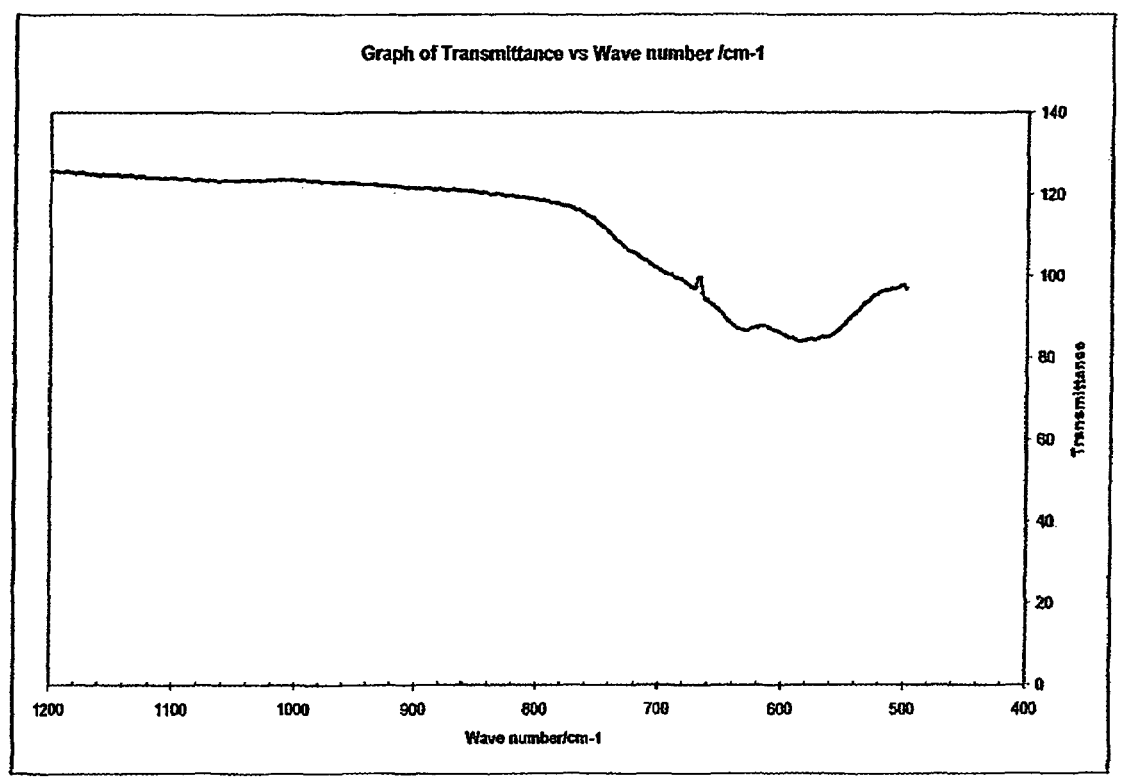
FIG. 15 shows the FT-IR pattern of nano-sized $Fe_2O_3$ particles prepared in Example 18.

FIG. 15 shows the FTIR pattern of nano-sized $Fe_2O_3$ particles prepared in this example. It can be seen from FIG. 15 that a double valley in the transmittance at around 600-1. This identifies the crystal structure almost exclusively corresponded to a maghemite ($\gamma$-$Fe_2O_3$) crystalline system, which can be easily distinguished from magnetite ones.

Example 19

$Fe_3O_4$ particles were prepared in accordance with the process as described in example 17 except that $NH_3$—$H_2O$ solution was substituted with tetramethylammonium hydroxide ($N(CH_3)_4OH$) solution.

The TEM and XRD results were similar with that of Example 17.

Example 20

$Fe_3O_4$ particles were prepared in accordance with the process as described in example 17 except that ferrous chloride was substituted by Ferrous sulphate ($FeSO_4$).

The TEM and XRD results were similar with that of Example 17.

Examples 21-26

Preparation of Nano-Sized Particles of Zinc Sulfide

Example 21

$(CH_3COO)_2Zn.2H_2O$ was dissolved in DI water to form 5.0 L zinc salt solution with concentration of about 1.0 $mol \cdot L^{-1}$ and then stored in the metal salt tank 113.

5.0 L $Na_2S$ solution with a concentration of about 1.2 $mol \cdot L^{-1}$ was prepared by dissolving $Na_2S.2H_2O$ in DI water and then stored in the tank 118. All reagents of chemical grade were used without further purification.

The zinc salt solution and sodium sulfide salt solution were simultaneously pumped at a fixed flow rate of 0.5 L·min−1 respectively into the reaction zone 101A of the molecular mixing unit 100 at about 25° C. during the mixing and reacting steps. The ivory-white precipitate formed immediately.

The high-gravity level of the packed bed 102 was at a fixed level of 2500 $m \cdot s^{-2}$. The injection speed for the two chloride solutions from liquid inlets 104a and 104b were 5 $m \cdot s^{-1}$. The residence time in the molecular mixing unit 100 was fixed at about 15 s.

The slurry suspension was removed from the molecular mixing unit 100 and collected in the product tank 140.

Phase separation occurred and the top liquid was decanted away.

The remaining slurry mixture was filtered and washed with DI water. The washed precipitate was then collected and re-dispersed in DI water to form ZnS nanoparticles suspension.

Figure 16:
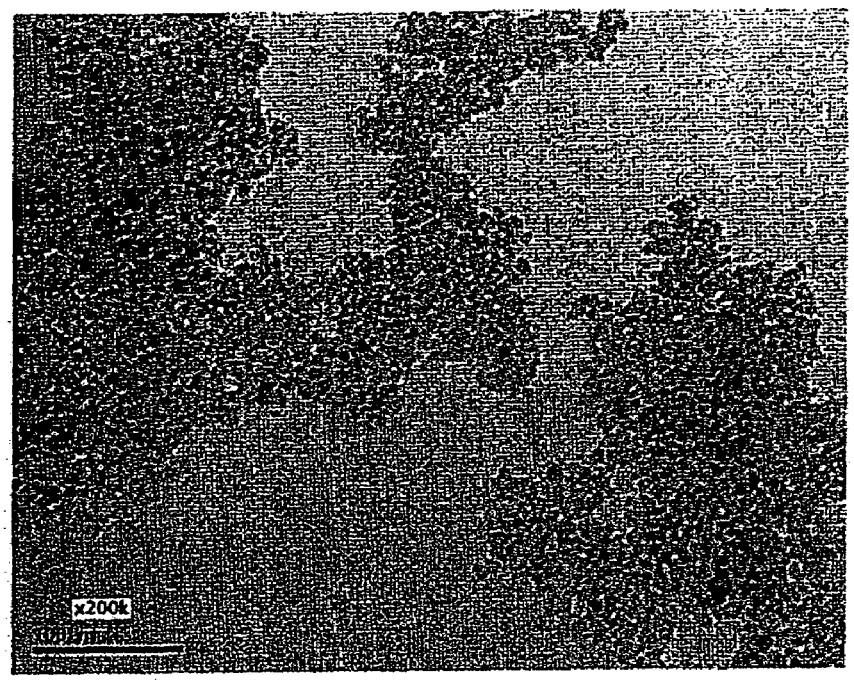
FIG. 16(a) shows a TEM image of nano-sized ZnS particles prepared in Example 21 and FIG. 16(b) shows the HRTEM image of FIG. 16(a), wherein the scale bar is 5 nm.
Figure 16:
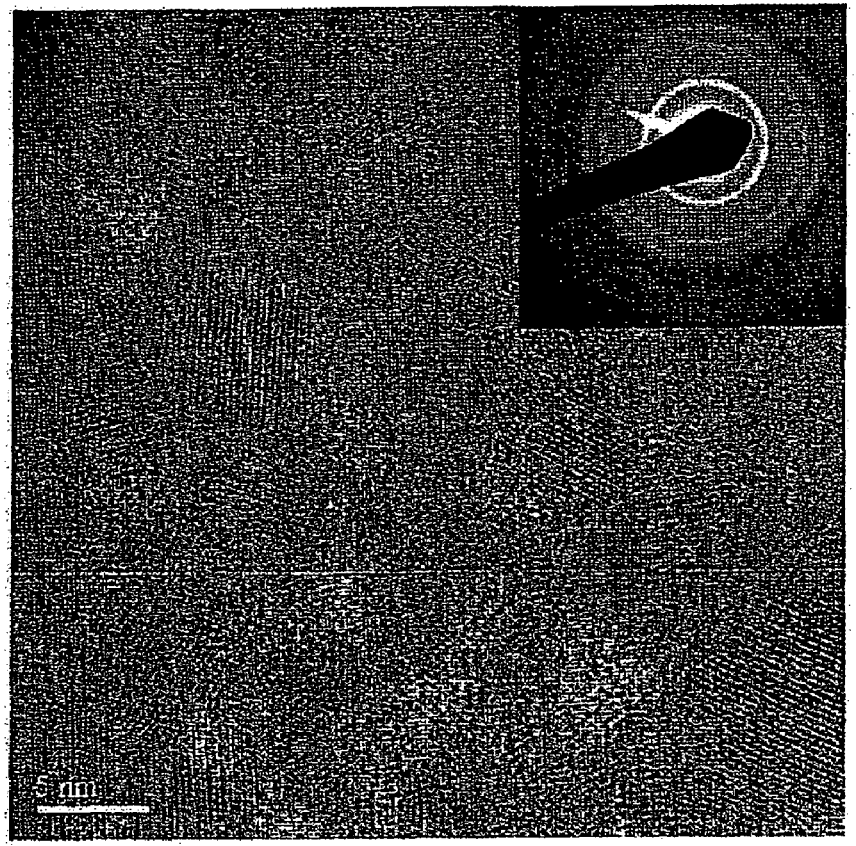

FIGS. 16(a) and 16(b) show TEM and HRTEM images of nano-sized ZnS particles prepared in this example. It can be seen from the figures that the average particle size of ZnS particles was about 5 nm and the morphology of the particles was spherical. The secondary average particle size and particle size distribution of ZnS nanoparticles determined by Dynamic Light Scattering Particle Size Analyzer LB-500 revealed to be an average particle size of 30 nm having a half width of 5 nm.

Figure 17:
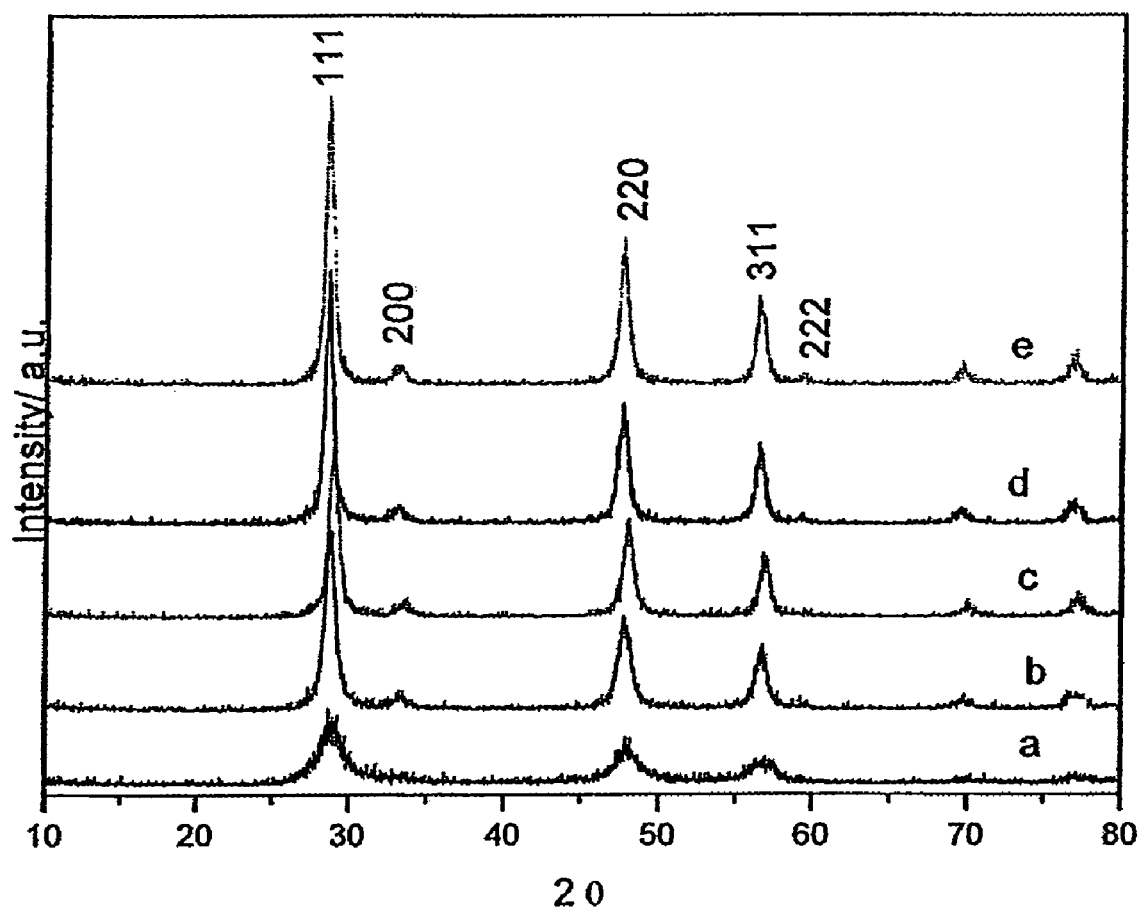
FIG. 17 shows the XRD patterns of nano-sized ZnS particles prepared in Examples 21-25.

FIG. 17A shows the XRD pattern of nano-sized ZnS particles prepared in this example. It can be seen from FIG. 17a that the crystal structure was almost exclusively indexed to a wurtzite crystalline system.

Example 22

Figure 18:
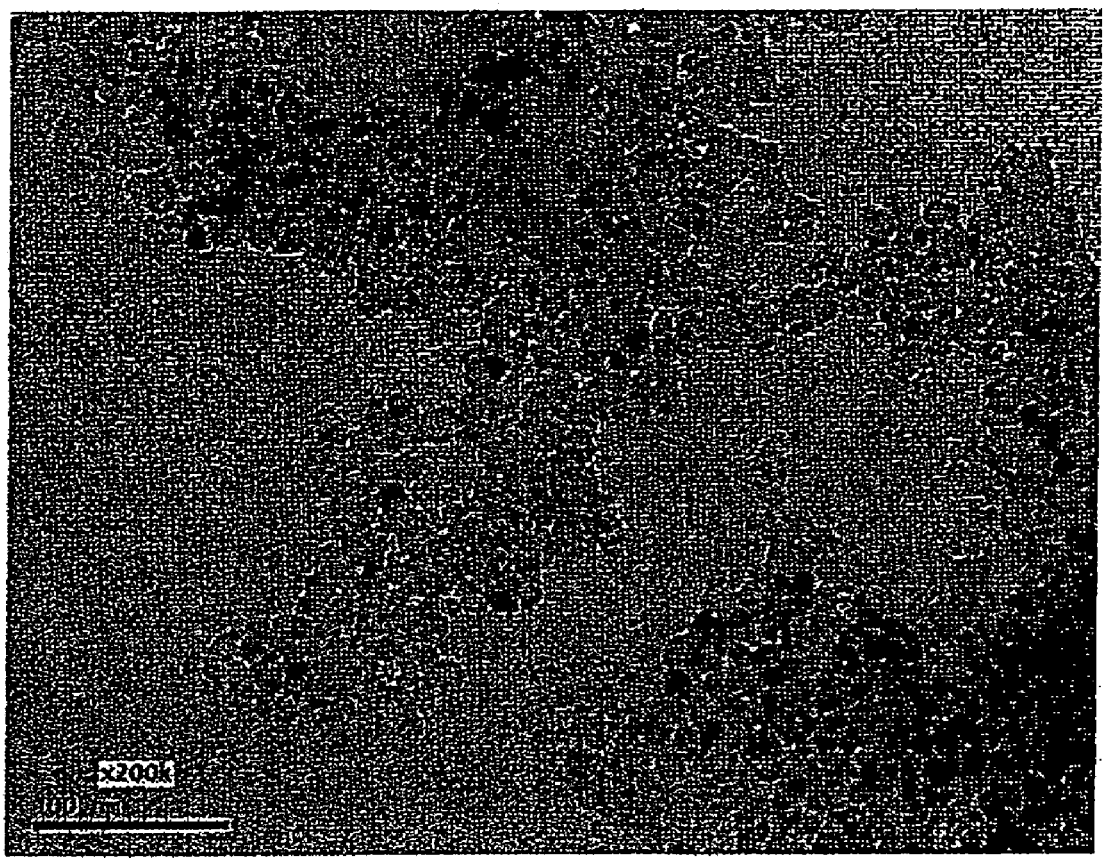
FIG. 18 shows a TEM image of nano-sized ZnS particles prepared in Example 22.

ZnS particles were prepared in accordance with the process as described in example 21 were repeated except adding the aging process. The aging temperature was at 92° C. and the aging time is 1 hr. The TEM analysis result was shown in FIG. 18. It is seen from TEM that the average particle size of ZnS particles was about 10 nm and the morphology of the particles was spherical. The secondary average particle size and particle size distribution of ZnS nanoparticles determined by Dynamic Light Scattering Particle Size Analyzer LB-500 revealed to be an average particle size of 70 nm having a half width of 20 nm.

FIG. 17b shows the XRD pattern of nano-sized ZnS particles prepared in this example. It can be seen from FIG. 17b that the crystal structure was almost exclusively indexed to a wurtzite crystalline system.

Example 23

Figure 19:
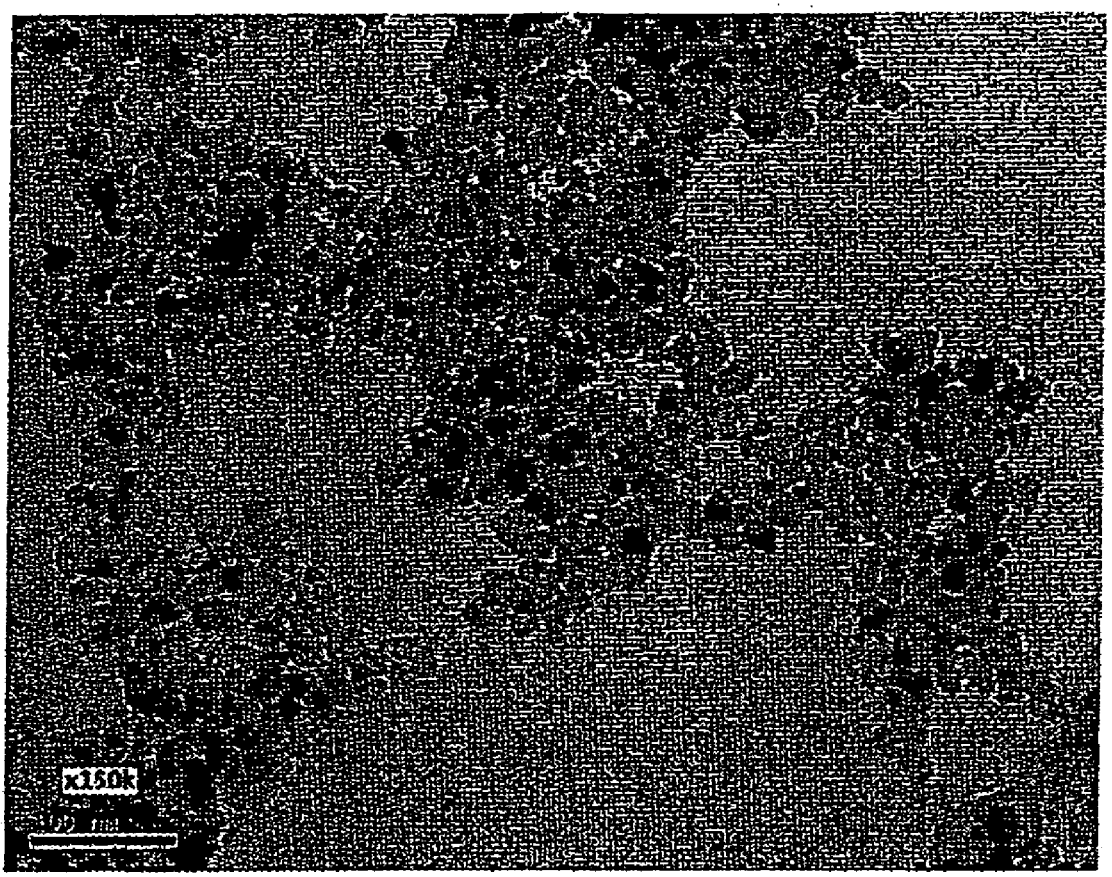
FIG. 19 shows a TEM image of nano-sized ZnS particles prepared in Example 23.

ZnS particles were prepared in accordance with the process as described in example 21 except that an aging process was included in this Example. The aging temperature was at 92° C. and the aging time was 2 hr. The TEM analysis result was shown in FIG. 19. It is seen from TEM that the average particle size of ZnS particles was about 15 nm and the morphology of the particles was spherical. The secondary average particle size and particle size distribution of ZnS nanoparticles determined by Dynamic Light Scattering Particle Size Analyzer LB-500 revealed to be an average particle size of 80 nm having a half width of 20 nm.

FIG. 17c shows the XRD pattern of nano-sized ZnS particles prepared in this example. It can be seen from FIG. 17c that the crystal structure was almost exclusively indexed to a wurtzite crystalline system.

Example 24

ZnS particles were prepared in accordance with the process as described in example 23 except that the zinc salt solution was changed to zinc nitrate solution.

Figure 20:
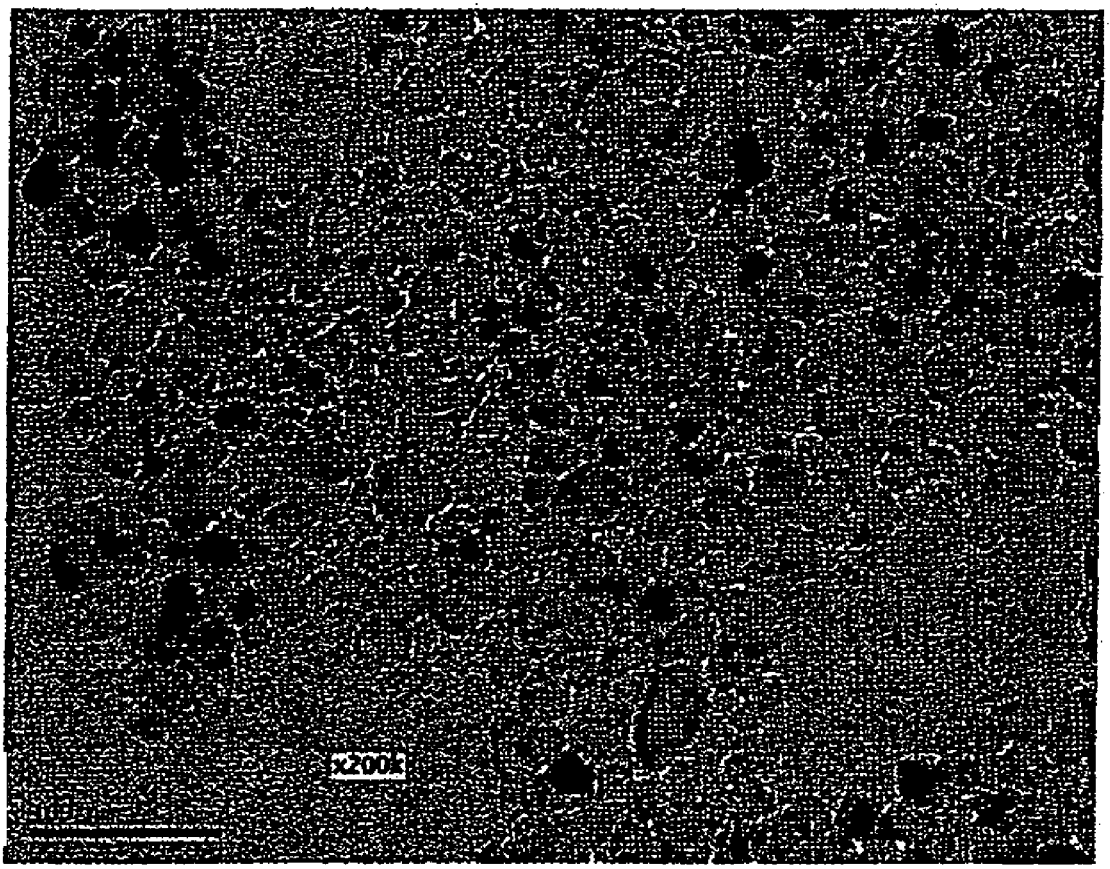
FIG. 20 shows a TEM image of nano-sized ZnS particles prepared in Example 24.

The TEM analysis result was shown in FIG. 20. It is seen from TEM that the average particle size of ZnS particles was about 20 nm and the morphology of the particles was spherical. The secondary average particle size and particle size distribution of ZnS nanoparticles determined by Dynamic Light Scattering Particle Size Analyzer LB-500 revealed to be an average particle size of 100 nm having a half width of 30 nm.

FIG. 17d shows the XRD pattern of nano-sized ZnS particles prepared in this example. It can be seen from FIG. 17d that the crystal structure was almost exclusively indexed to a wurtzite crystalline system.

Example 25

Figure 21:
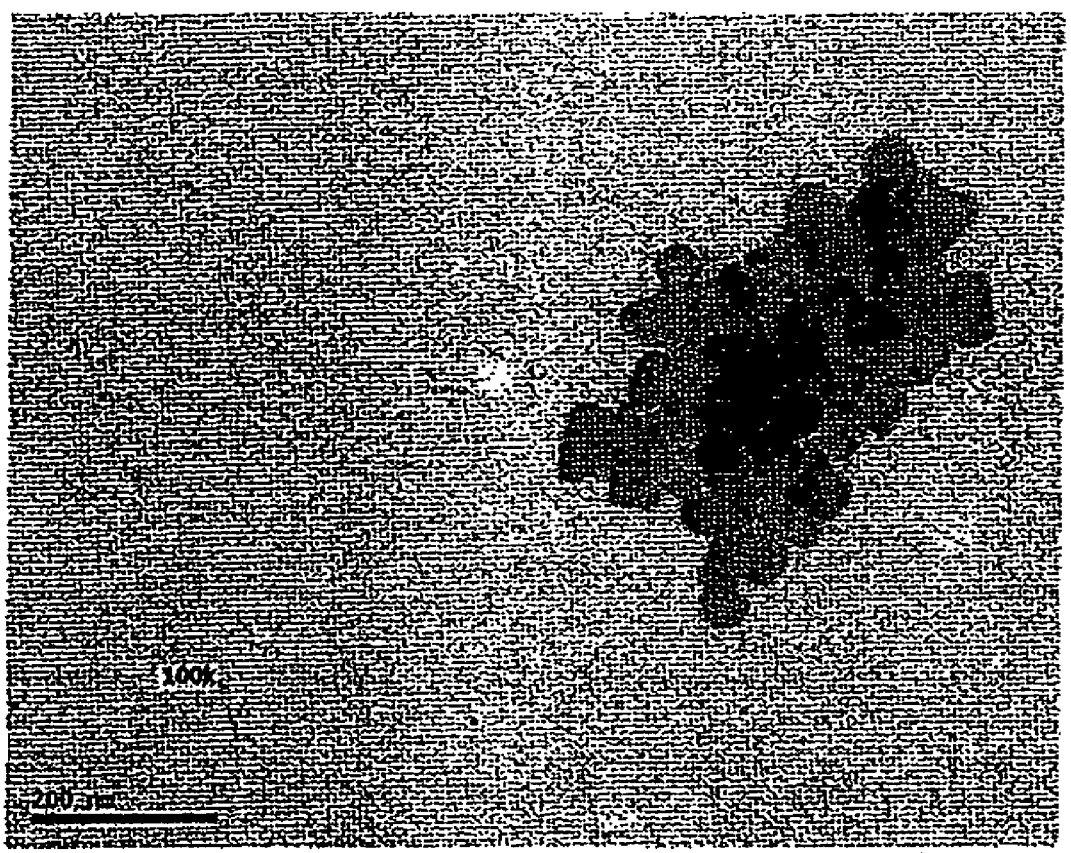
FIG. 21 shows a TEM image of nano-sized ZnS particles prepared in Example 25.

ZnS particles were prepared in accordance with the process as described in example 21 except that an aging process was added. The aging temperature was at 200° C. and the product tank 140 was closed when increasing the temperature. The aging time was 2 hr. The TEM analysis result was shown in FIG. 21. It is seen from TEM that the average particle size of ZnS particles was about 40 nm and the morphology of the particles was spherical. The secondary average particle size and particle size distribution of ZnS nanoparticles determined by Dynamic Light Scattering Particle Size Analyzer LB-500 revealed to be an average particle size of 120 nm having a half width of 30 nm.

FIG. 17e shows the XRD pattern of nano-sized ZnS particles prepared in this example. It can be seen from FIG. 17e that the crystal structure was almost exclusively indexed to a wurtzite crystalline system.

Example 26

Preparation of Nano-Sized Particles of Tin Oxide $SnCl_4$ was slowly dissolved in DI water to form 5.0 L tin salt solution with concentration of about 0.5 $mol \cdot L^{-1}$ and then stored in the metal salt tank 113. HCl was added to the metal salt tank 113 to ensure that the solution is transparent. The pH was adjusted to about 3.

5.0 L NaOH solution with concentration of about 2.0 $mol \cdot L^{-1}$ was prepared by dissolving NaOH in DI water and then stored in the tank 118. All reagents of chemical grade were used without further purification.

The tin salt solution and NaOH solution were simultaneously pumped at a fixed flow rate of 0.5 $L \cdot min^{-1}$ respectively for both solutions into the reaction zone 101A of the molecular mixing unit 100 at room temperature to mix and react. The ivory-white precipitate formed immediately. The pH value of the product suspension was monitored and held between at about 6-7 by subtly varying the flow ratio of the tin salt solution and the NaOH solution.

The high-gravity level of the packed bed 102 was at a fixed level of 2500 $m \cdot s^{-2}$. The injection speed for the two chloride solutions from liquid inlets 104a and 104b were 5 $m \cdot s^{-1}$. The residence time in the molecular mixing unit 100 was fixed at about 15 s.

The slurry suspension was removed from the molecular mixing unit 100 and collected in the product tank 140. The temperature of the suspension was then gradually increased to 95° C. under sufficient stirring to ensure the particles do not settle down and the suspension maintains the same homogeneity as the slurry flow out from the molecular mixing unit. The pH value of the mixture in the product tank 140 was monitored and was held at about 6-7 by adding 0.01 $mol \cdot L^{-1}$ HCl or 0.01 $mol \cdot L^{-1}$ NaOH as the temperature of the suspension gradually rose. The suspension was maintained at 95° C. for 2 hours. After the 2 hours, the suspension was cooled to about 25° C. and agitation ceased.

Phase separation occurred in the suspension and the top liquid was decanted away.

The remaining mixture was filtered and washed with DI water. The washed precipitate was then collected and re-dispersed in DI water to form $SnO_2$ nanoparticles suspension.

Figure 22:
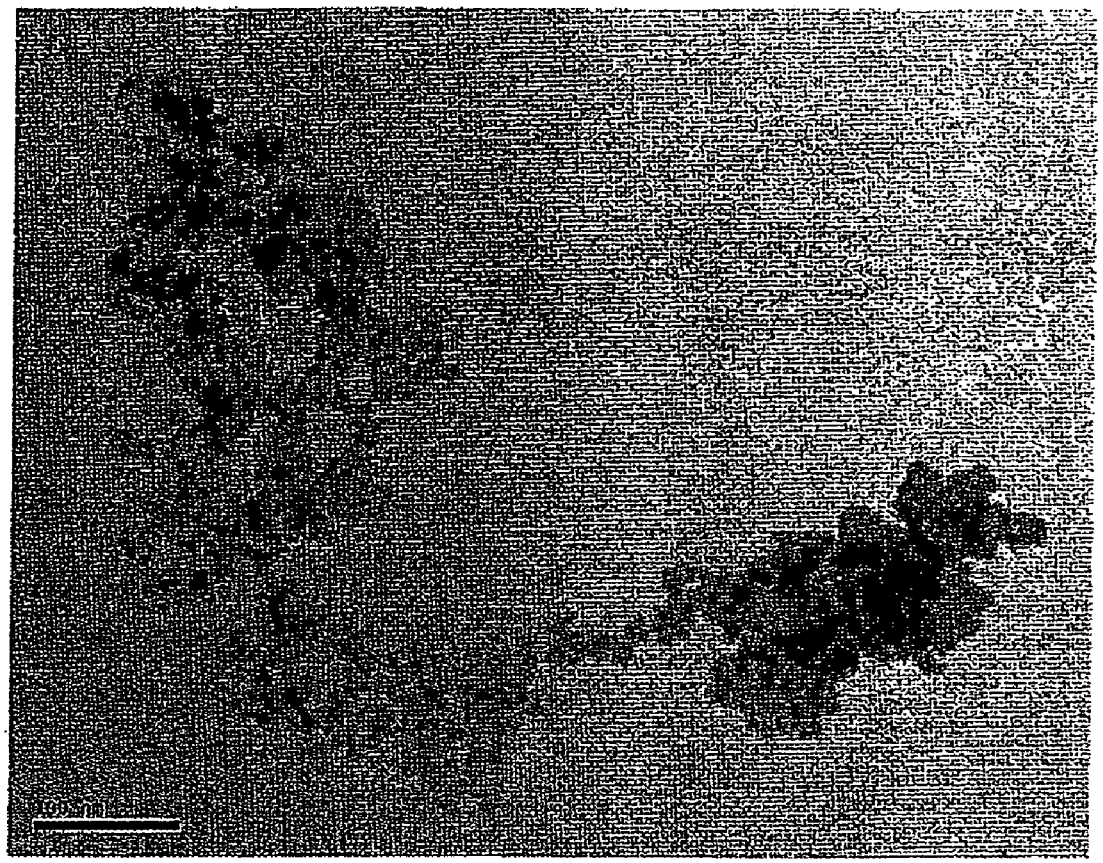
FIG. 22 shows a TEM image of nano-sized $SnO_2$ particles prepared in Example 26.

FIG. 22 shows the TEM of nano-sized $SnO_2$ particles prepared in this example. It can be seen from FIG. 22 that the average particle size of $SnO_2$ particles is about 10 nm and the morphology of the particles is near-prism shaped. The secondary average particle size and particle size distribution of $SnO_2$ nanoparticles determined by Dynamic Light Scattering Particle Size Analyzer LB-500 revealed to be an average particle size of 40 nm having a half width of 8 nm.

Figure 23:
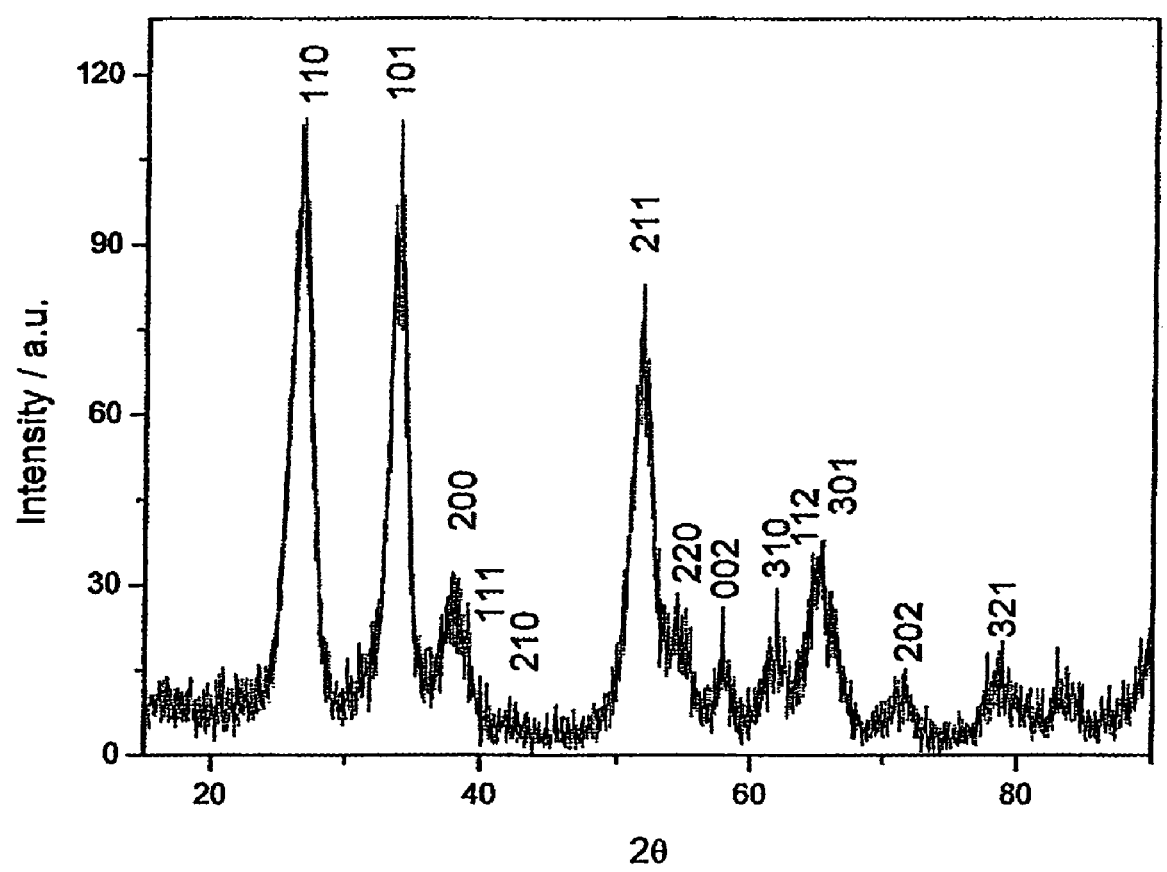
FIG. 23 shows the XRD patterns of nano-sized $SnO_2$ particles prepared in Example 26.

FIG. 23 shows the XRD pattern of nano-sized $SnO_2$ particles prepared in this example. It can be seen from FIG. 11 that the crystal structure could exclusively index to single-phase $SnO_2$ with a monoclinic structure and the diffraction data were in good agreement with JCPDS card of SnO2 (JCPDS 41-1445). No peaks of impurity are observed in the XRD pattern.

Examples 27-28

Preparation of Nano-Sized Particles of Titanium Oxide

Example 27

$TiCl_4$ was used as a starting material for the synthesis of $TiO_2$ nanoparticles. $TiCl_4$ could not be directly dissolved in water because of its rapid exothermic reaction, which produces orthotitanic acid, release large amounts of heat. A mixture of HCl and water (volume ratio of 1:19, 36% $HCl:H_2O$) $TiCl_4$ was therefore used and the dissolution was performed at ice-cooled temperature with vigorous stirring to form 5.0 L titanium salt solution with concentration of 0.2 $mol \cdot L^{-1}$. and then stored in the metal salt tank 113. HCl was added in the above solution to ensure the solution is transparent. The pH was about 3.

5.0 L NaOH solution with concentration of about 0.8 $mol \cdot L^{-1}$ was prepared by dissolving NaOH in DI water and then stored in the base or chalcogenide salt tank 118. All reagents of chemical grade were used without further purification.

The above titanium salt solution and NaOH solution were simultaneously pumped with fixed flow rate of 0.5 $L \cdot min^{-1}$ respectively for both solutions into the molecular mixing unit 100 at temperature of 60° C. during mixing and reaction of the reactants. An ivory-white precipitate was formed immediately. The pH value of the slurry suspension was maintained at about 6-7 by subtly vary the flow ratio of the titanium salt solution and the NaOH solution.

The high-gravity level the packed bed 102 was at a fixed level of 2500 $m \cdot s^{-2}$. The injection speed for the two chloride solutions from liquid inlets 104a and 104b were 5 $m \cdot s^{-2}$. The residence time in the molecular mixing unit 100 was fixed at about 15 s.

The slurry suspension was removed from the molecular mixing unit 100 and collected in the product tank 140. The temperature of the suspension was then gradually increased to 95° C. under stirring to ensure the particles do not settle down and the suspension keeps the same homogeneity as the slurry flow out from the molecular mixing unit. The pH value of the mixture in the product tank 140 was monitored and was held at about 5-6 by adding 0.01 $mol \cdot L^{-1}$ HCl as the temperature of the suspension gradually rose. The slurry suspension was maintained at 95° C. for 0.5 hour before cooling to a temperature of about 25° C.

Phase separation occurred in the suspension and the top liquid was decanted away.

The remaining mixture was then filtered and washed with DI water. The washed precipitate was then collected and re-dispersed in DI water to form $TiO_2$ nanoparticles suspension.

Figure 24:
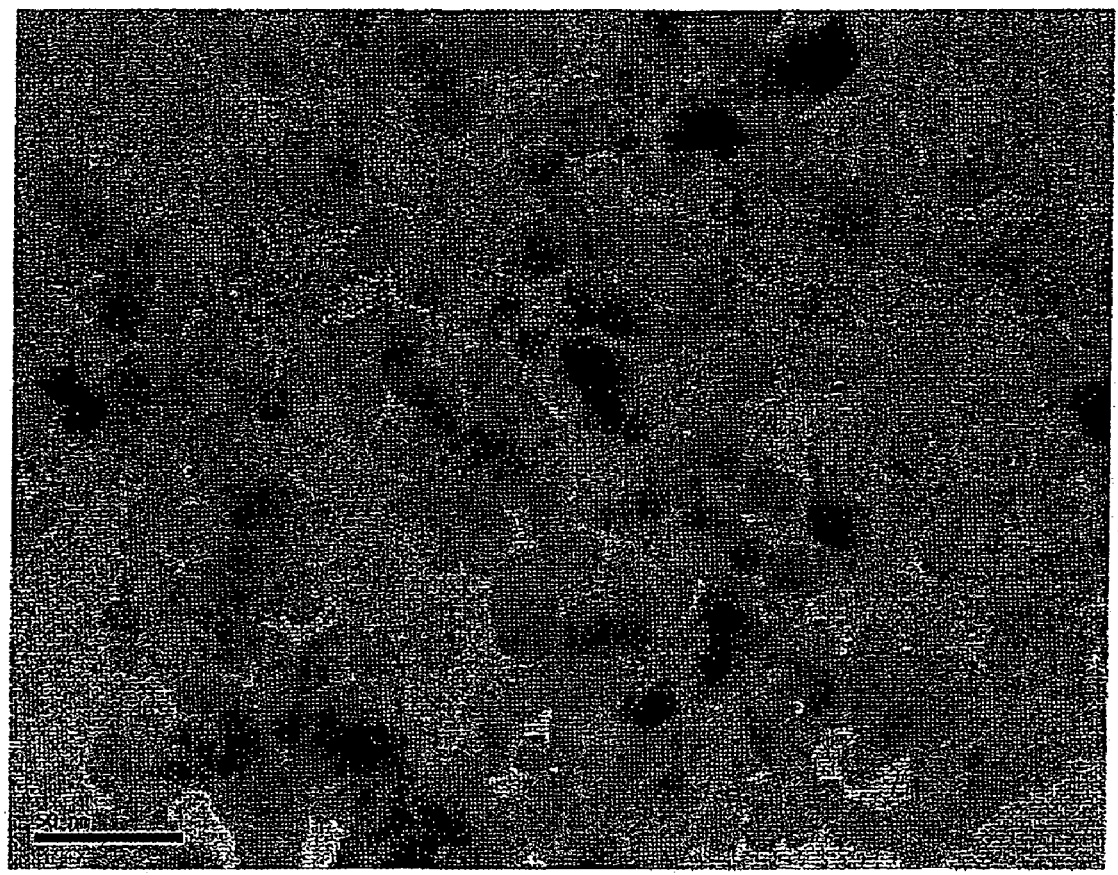
FIG. 24 shows a TEM image of nano-sized $TiO_2$ particles prepared in Example 27.

FIG. 24 shows the TEM of nano-sized $TiO_2$ particles prepared in this example. It is shown that the average particle size of $TiO_2$ particles was about 8 nm and the morphology of the particles was near-rhombohedron and prism. The secondary average particle size and particle size distribution of $TiO_2$ nanoparticles determined by Dynamic Light Scattering Particle Size Analyzer LB-500 revealed to be an average particle size of 35 nm having a half width of 8 nm.

Figure 25:
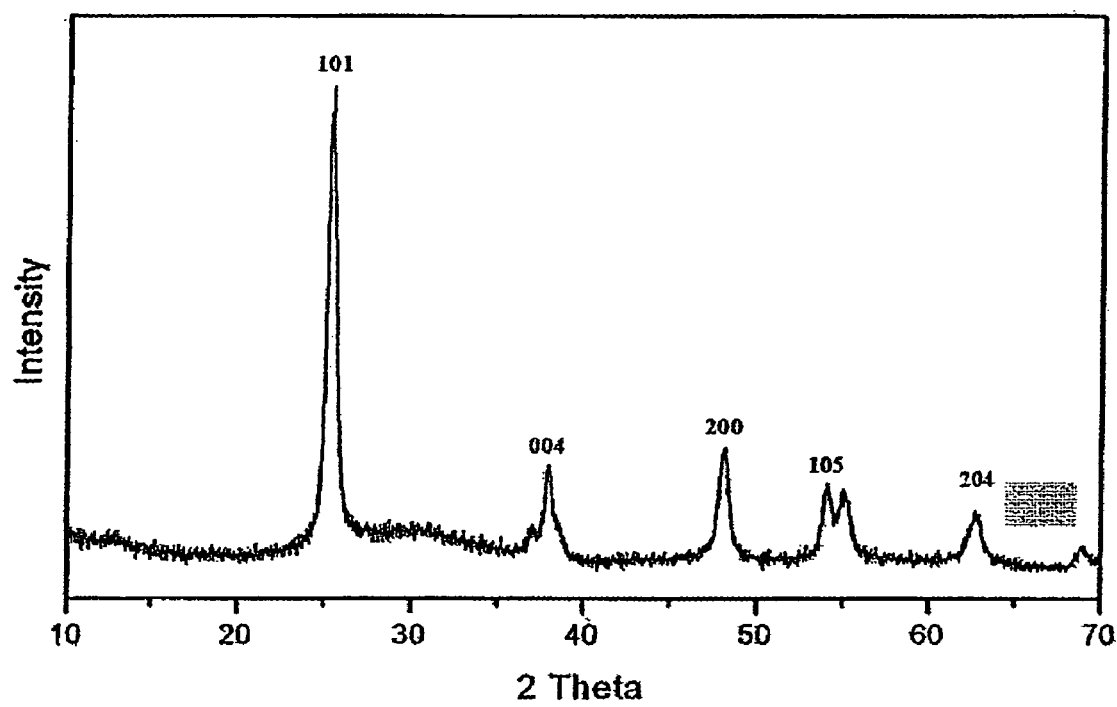
FIG. 25 shows the XRD patterns of nano-sized $TiO_2$ particles prepared in Example 27.

FIG. 25 shows the XRD pattern of nano-sized $TiO_2$ particles prepared in this example. It can be seen from FIG. 25 that the crystal structure could exclusively index to single-phase $TiO_2$ with a monoclinic structure of anatase. No peaks of impurity are observed in the XRD pattern.

Example 28

$TiO_2$ particles were prepared in accordance with the process as described in example 27 except that a mixture of ethanol and water was used as solvent to dissolve $TiCl_4$. The volume ratio of ethanol-water is 3:1. After the temperature of the suspension in the product tank 140 gradually increased to 95° C., the slurry was then directly cooled down to about 25° C.

TEM analysis shows that the prepared particles in this sample were well-defined rod-like shape with particle size of about 100 nm length to 20 nm width.

XRD pattern of nano-sized $TiO_2$ particles prepared in this example shows that the crystal structure could index to a $TiO_2$ with a structure of rutile.

Example 29

Preparation of Nano-Sized Particles of Zirconium Oxide $ZrCl_4$ was slowly dissolved in ice water to form 5.0 L zirconium salt solution with concentration of about 0.5 $mol \cdot L^{-1}$ and then stored in the metal salt tank 113. Some HCl was added in the above solution to ensure the solution is transparent. The pH was about 4.

5.0 L NaOH solution with concentration of about 2.0 $mol \cdot L^{-1}$ was prepared by dissolving NaOH in DI water and then stored in tank 118. All reagents of chemical grade were used without further purification.

The above zirconium salt solution and NaOH solution were simultaneously pumped at a fixed flow rate of 0.5 $L \cdot min^{-1}$ respectively for both solutions into the reaction zone of the molecular mixing unit 100 at temperature of 60° C. during the mixing and reaction of the reactants. An ivory-white precipitate is formed immediately. The pH value of the product suspension was maintained at about 6-7 by subtly varying the flow ratio of the zirconium salt solution and the NaOH solution.

The high-gravity level for the packed bed 102 was at a fixed level of 2500 $m \cdot s^{-2}$. The injection speed for the two chloride solutions from liquid inlets 104a and 104b were 5 $m \cdot s^{-1}$. The residence time in the molecular mixing unit 100 was fixed at about 15 s.

The slurry suspension was removed from the molecular mixing unit 100 and collected in the product tank 140. The slurry was is collected into the product tank 140. The temperature of the suspension was then gradually increased to 95° C. under sufficient stirring to ensure the particles do not settle down and the suspension keeps the same homogeneity as the slurry flow out from the molecular mixing unit. The pH value of the mixture in the product tank 140 was monitored and was held at about 5-6 by adding 0.01 $mol \cdot L^{-1}$ HCl as the temperature of the suspension gradually rose. The slurry suspension was maintained at 95° C. for 1 hour before cooling to a temperature of about 25° C.

Phase separation occurred in the suspension and the top liquid was decanted away.

The remaining mixture was then filtered and washed with DI water. The washed precipitate was then collected and re-dispersed in DI water to form $ZrO_2$ nanoparticles suspension.

TEM analysis of nano-sized $ZrO_2$ particles prepared in this sample shown that the average particle size of $ZrO_2$ particles is about 7 nm and the morphology of the particles is near-prism. The secondary average particle size and particle size distribution of $ZrO_2$ nanoparticles determined by Dynamic Light Scattering Particle Size Analyzer LB-500 revealed to be an average particle size of 25 nm having a half width of 7 nm.

XRD pattern of nano-sized ZrO2 particles prepared in this sample revealed that the crystal structure could exclusively index to single-phase of $ZrO_2$ with a monoclinic tetroganol structure. No peaks of impurity are observed in the XRD pattern.

Examples 30-31

Preparation of Nano-Sized Particles of Copper Oxide

Example 30

Copper acetate was dissolved in DI water to form 5.0 L copper salt mixture with concentration of about 0.05 $mol \cdot L^{-1}$. The copper salt mixture was mixed with some glacial acetic to form transparent copper salt solution and then stored in the metal salt tank 113. The pH was adjusted to about 3.

5.0 L NaOH solution with concentration of about 0.1 $mol \cdot L^{-1}$ was prepared by dissolving NaOH in DI water and then stored in the tank 118. All reagents of chemical grade were used without further purification.

The above copper salt solution and NaOH solution were simultaneously pumped at a fixed flow rate respectively for both solutions into the reaction zone 101A of the molecular mixing unit 100 at a temperature of 95° C. during the mixing and reacting of the reactants. The flow ratio of copper salt solution and NaOH solution was maintained such that the pH of the reactants was about 6-7. A black precipitate formed immediately.

The high-gravity level of the packed bed 102 was at a fixed level of 2500 $m \cdot s^{-2}$. The injection speed for the two chloride solutions from liquid inlets 104a and 104b were 5 $m \cdot s^{-1}$. The residence time in the molecular mixing unit 100 was fixed at about 15 s.

The slurry suspension was removed from the molecular mixing unit 100 and collected in the product tank 140.

After being cooled to about 25° C., phase separation occurred in the suspension and the top liquid was decanted away.

The remaining mixture was then filtered and washed with DI water. The washed precipitate was then collected and re-dispersed in DI water to form a well dispersed CuO nanoparticles suspension.

The average particle size of CuO particles determined by TEM was about 5.0 nm and the morphology of the particles was spherical. The secondary average particle size and particle size distribution of CuO nanoparticles determined by Dynamic Light Scattering Particle Size Analyzer LB-500 revealed to be an average particle size of 20 nm having a half width of 5 nm.

The XRD pattern of nano-sized CuO particles prepared in this sample shown the crystal structure of the sample could exclusively index to single-phase CuO with a monoclinic structure and the diffraction data were in good agreement with JCPDS card of CuO (JCPDS 80-1268). No peaks of impurity are observed in the XRD pattern.

Example 31

CuO particles were prepared using the process as described in example 30 except below for the following:
1. copper salt solution was changed to copper nitrate solution (0.1 mol·L$^{-1}$).
2. The reaction temperature was changed to 90° C.
3. the aging procedure was added, the aging time for suspension in product tank was 10 minutes. TEM analysis result shown that the sample prepared in this example was needle shape with width of 5-10 nm and the aspect ratio of 10-15.

The XRD pattern of nano-sized CuO particles prepared in this sample shown the crystal structure of the sample could exclusively index to single-phase CuO with a monoclinic structure and the diffraction data were in good agreement with JCPDS card of CuO (JCPDS 80-1268). No peaks of impurity are observed in the XRD pattern.

Applications

It will be appreciated that the disclosed process can enable direct synthesis of forming metal chalcogenides, metal hydroxides and metal oxides synthesis without the production of intermediates. Accordingly, post-treatment steps such as calcining, is not necessary.

It will be appreciated that the incorporation of the ageing step into the process can result in an increase of particle crystallinity, change of the particle crystal structure or increase in particle size of the formed nano-sized precipitate particles to the micro-sized range.

It will be appreciated that the shear force that is applied to the reactant mixture separates the mixture into very fine droplets, thread or thin film to thereby result in a high mass transfer rate between the reactant solutions. This results in an intense micro-mixing between the two liquids to form a uniformly-supersaturated solution in which precipitates the micro-sized or nano-sized metal chalcogenides, metal hydroxides or metal oxides.

It will be appreciated that the capacity of the process can be scaled up to form larger quantities of micro-size or nano-size precipitate particles, without affecting the stability and the particle size distribution of the product.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

It should be appreciated that the process is not limited to preparation of metal oxide or chalcogenide compounds particles listed in the invention but can be used to preparation of other metal chalcogenide compounds or other inorganic compounds particles.

The invention claimed is:

1. A process of making nano-sized or micro-sized precipitate particles, the process comprising the steps of:

mixing, in a reaction zone at a high gravity level, a metal salt solution with a precipitant solution to form a precipitate, said precipitate being at least one of a metal chalcogenide, metal hydroxide and metal oxide; and applying a shear force to said mixing solutions in said reaction zone during said mixing step, wherein said shear force and the conditions within said reaction zone form said micro-sized or nano-sized precipitate particles in said reaction zone, wherein said shear force precipitates particles having a narrow particle size distribution.

2. A process according to claim 1, further comprising the step of:

ageing the nano-sized metal precipitate particles.

3. A process according to claim 2, wherein said ageing step is undertaken under conditions to form substantially crystalline nano-sized or micro-sized particles.

4. A process according to claim 1, comprising the step of selecting said metal salt solution from the group consisting of metal acetate salt, metal halide salt, metal nitrate salt, metal sulphate salt, metal phosphate salt, hydrates and mixtures thereof.

5. A process according to claim 4, comprising the step of selecting said metal of said metal salt from the group consisting of alkali metals, alkaline earth metals, transition metals and metals from the main groups of the Periodic Table of Elements.

6. A process according to claim 1, comprising the step of selecting a base as the precipitant solution.

7. A process according to claim 6, wherein the base is an oxygen-containing base.

8. A process according to claim 7, comprising the step of selecting said oxygen-containing base from the group consisting of alkali metal hydroxides, alkali metal carbonates, alkaline earth metal hydroxides, alkaline earth metal carbonates, alkaline earth metal hydrogen carbonates, ammonia solution, organic base and mixtures thereof.

9. A process according to claim 1, comprising the step of selecting a metal chalcogenide salt solution as precipitant solution.

10. A process according to claim 9, wherein the anion of said metal chalcogenide salt is selected from the group consisting of sulphides, HS$^-$, Se$^{2-}$, SeO$_3^{2-}$, Te$^{2-}$, TeO$_3^{2}$, their hydrates and mixtures thereof.

11. A process according to claim 1, wherein the step of applying said shear force comprises the step of agitating said mixing solutions in said reaction zone.

12. A process according to claim 1, wherein said shear force creates flow conditions within said reaction zone having a Reynolds Number of about 2000 to about 200000.

13. A process according to claim 1, comprising the step of providing a surfactant in said mixing solution, said surfactant selected from the group consisting of anionic surfactants, cationic surfactants, non-ionic surfactants, polymeric surfactants and mixtures there of.

14. A process according to claim 13, comprising the step of selecting the concentration of said surfactant from about 0.05% to about 10% by weight of mixture.

15. A process according to claim 1, comprising the step of adding a particle dispersant to said mixing solution.

16. A process according to claim 1, comprising the step of forming said nano-sized or micro-sized precipitate particles with a general formula MaXb, wherein M is a transition metal selected from the group consisting of group IB, group IIB, group IVA and group VIIB of the Periodic Table of Elements; and X is oxygen or a chalcogen;

a is an integer of 1, 2 or 3;

b is an integer of 1, 2, 3, 4 or 5; and wherein combinations of a and b are such that the overall charge of the compound MaXb is zero.

17. A process according to claim 1, comprising the step of: injecting a gas into said reaction zone during said applying step.

18. A process according to claim 1, wherein said high gravity level is selected from the group consisting of about 100 to about 15000 m·s-2, about 500 to about 2000 m·s-2, about 1000 to about 5000 m·s-2, and about 800 to about 5000 m·s-2.

19. A system for making nano-sized or micro-sized precipitate particles, the system comprising:

a reactor having a mixture of a metal salt solution and a precipitant solution which react to form a precipitate, said precipitate being at least one of a metal chalcogenide, metal hydroxide and metal oxide; and an agitator comprising a packed bed for agitating said mixture in said reactor to apply a shear force at a high gravity level to said mixing solutions under conditions to form nano-sized or micro-sized precipitate particles having a narrow particle size distribution.

20. A reactor for making nano-sized precipitate particles, the reactor comprising:

a reaction zone containing a mixture of a metal salt solution and a precipitant solution which react to form a precipitate, said precipitate being at least one of a metal chalcogenide, metal hydroxide and metal oxide; and an agitator comprising a packed bed for agitating said mixture in said reaction zone to apply a shear force at a high gravity level to said mixing solutions under conditions to form nano-sized precipitate particles having a narrow particle size distribution.

* * * * *